(12) United States Patent
Lane et al.

(10) Patent No.: US 12,734,895 B2
(45) Date of Patent: Sep. 15, 2026

(54) DYNAMIC DETERMINATION OF BLENDED AXLE SPLIT FOR BRAKING

(71) Applicant: Caterpillar Inc., Peoria, IL (US)

(72) Inventors: Cameron Thomas Lane, Oro Valley, AZ (US); Karl P Schneider, Decatur, IL (US); Andrew John Olson, Vail, AZ (US)

(73) Assignee: Caterpillar Inc., Peoria, IL (US)

( * ) Notice: Subject to any disclaimer, the term of this patent is extended or adjusted under 35 U.S.C. 154(b) by 166 days.

(21) Appl. No.: 18/673,049

(22) Filed: May 23, 2024

(65) Prior Publication Data

US 2025/0360798 A1 Nov. 27, 2025

(51) Int. Cl.
*B60L 7/26* (2006.01)
*B60T 1/10* (2006.01)
(Continued)

(52) U.S. Cl.
CPC .................. *B60L 7/26* (2013.01); *B60T 1/10* (2013.01); *B60T 8/172* (2013.01); *B60L 2200/40* (2013.01); *B60L 2240/26* (2013.01); *B60L 2240/36* (2013.01); *B60L 2240/642* (2013.01); *B60T 2270/604* (2013.01);
(Continued)

(58) Field of Classification Search
CPC ........ B60T 8/1708; B60T 8/171; B60T 8/172; B60T 8/26; B60T 17/22; B60T 2270/604; B60T 2270/608; B60T 1/10; B60T 8/1766; B60W 2510/184; F16D 2066/001;
(Continued)

(56) References Cited

U.S. PATENT DOCUMENTS

| | | | | |
|---|---|---|---|---|
| 6,378,636 B1 * | 4/2002 | Worrel | .................. | B60T 17/221 180/65.25 |
| 6,406,105 B1 * | 6/2002 | Shimada | .................. | B60L 7/26 303/152 |

(Continued)

FOREIGN PATENT DOCUMENTS

| | | | |
|---|---|---|---|
| DE | 10012448 A1 * | 10/2001 | ............ B60T 8/1766 |
| DE | 102008032544 A1 * | 2/2009 | ............ B60T 8/1766 |

(Continued)

OTHER PUBLICATIONS

EPO machine translation of JP 2004-352112 A (original JP document published Dec. 16, 2004) (Year: 2004).*

(Continued)

*Primary Examiner* — David A Testardi

(57) ABSTRACT

A machine, such as a haul truck or other work machine, has braking systems including front friction brakes on a front axle, rear friction brakes on a rear axle, and electric brakes on one or both axles. A braking controller uses factors such as a capacity of the electric brakes, a payload carried by the machine, a grade of a ground surface traveled by the machine, a temperature of the front friction brakes, and a temperature increase rate associated with the front friction brakes to dynamically determine a blended axle split associated with a braking operation to be performed by the machine. The blended axle split indicates portions of braking torque to be applied by the electric brakes on one or both axles, the front friction brakes on the front axle, and the rear friction brakes on the rear axle.

20 Claims, 5 Drawing Sheets

(51) Int. Cl.
*B60T 8/172* (2006.01)
*F16D 65/78* (2006.01)
*F16D 66/00* (2006.01)

(52) U.S. Cl.
CPC .. *B60T 2270/608* (2013.01); *B60W 2510/184* (2013.01); *F16D 65/78* (2013.01); *F16D 2066/001* (2013.01)

(58) Field of Classification Search
CPC .......... B60L 7/18; B60L 7/26; B60L 15/2009; B60L 2240/36; B60L 2240/423
See application file for complete search history.

(56) References Cited

U.S. PATENT DOCUMENTS 8,281,890 B2 10/2012 Heindl
8,545,365 B2 10/2013 Miyazaki
11,124,176 B2 9/2021 Plianos
11,247,561 B2 2/2022 Gully
11,253,299 B2 2/2022 May
2004/0046444 A1* 3/2004 Heubner ............... B60T 8/3225 303/113.5
2004/0238244 A1* 12/2004 Amanuma ................ B60L 7/26 903/917
2005/0067892 A9* 3/2005 Heubner ............... B60T 8/4072 303/113.5
2006/0055239 A1* 3/2006 Crombez .............. B60W 20/13 303/152
2006/0102394 A1* 5/2006 Oliver ............. B60W 30/18127 180/65.265
2007/0029874 A1* 2/2007 Finch ........................ B60T 1/10 303/152
2008/0100129 A1* 5/2008 Lubbers .................... B60L 7/18 303/113.1
2010/0250056 A1* 9/2010 Perkins ................... B60T 8/175 701/90
2015/0149055 A1* 5/2015 Newberry ................. B60T 8/26 701/70
2015/0328992 A1* 11/2015 Amaravadi ............... B60L 7/22 701/70
2016/0264111 A1* 9/2016 Doi ......................... B60T 8/267
2018/0244159 A1* 8/2018 Satterthwaite ............ B60T 8/30
2019/0161076 A1* 5/2019 Plianos ................. B60W 10/04
2019/0193571 A1* 6/2019 Wein ......................... B60L 7/18
2019/0263374 A1* 8/2019 Bill ....................... B64C 25/426
2019/0263510 A1* 8/2019 Bill ....................... B60T 17/221
2020/0164845 A1* 5/2020 Yukoku ................. B60T 13/586
2021/0114464 A1* 4/2021 Carbone ................... B60L 7/26
2021/0237583 A1* 8/2021 Huang .................... F16D 61/00
2021/0354671 A1* 11/2021 Cho .......................... B60T 8/26
2024/0270079 A1* 8/2024 Kim .......................... B60L 7/26
2024/0400015 A1* 12/2024 Schneider ............... B60T 17/22

FOREIGN PATENT DOCUMENTS

DE 102011013592 A1 * 9/2012 ................ B60L 7/18
EP 2528764 B1 2/2014
EP 3000294 A1 11/2018
JP 2004352112 A * 12/2004
JP 2005014692 A 1/2005
JP 2021049858 A * 4/2021
JP 2022063575 A * 4/2022
JP 2022129688 A 9/2022
KR 20110108919 A 10/2011
WO WO-2005110827 A1 * 11/2005 ............ B60T 13/586
WO WO-2018099864 A1 * 6/2018 ............. F16D 66/02

OTHER PUBLICATIONS

Written Opinion and International Search Report for Int'l. Patent Appln. No. PCT/US2025/027673, mailed Aug. 20, 2025 (10 pgs).

* cited by examiner

Target Machine Axle Split Map 144

Payload (%)

| Grade (%) | 0 | 20 | 40 | 60 | 80 | 100 | 120 |
|---|---|---|---|---|---|---|---|
| -15 | 0.52 | 0.50 | 0.47 | 0.44 | 0.41 | 0.39 | 0.36 |
| -10 | 0.52 | 0.49 | 0.46 | 0.43 | 0.40 | 0.37 | 0.34 |
| -5 | 0.51 | 0.48 | 0.45 | 0.41 | 0.38 | 0.35 | 0.32 |
| 0 | 0.50 | 0.47 | 0.43 | 0.40 | 0.36 | 0.33 | 0.30 |
| 5 | 0.49 | 0.45 | 0.42 | 0.38 | 0.35 | 0.31 | 0.27 |
| 10 | 0.48 | 0.44 | 0.40 | 0.36 | 0.33 | 0.29 | 0.25 |
| 15 | 0.46 | 0.43 | 0.39 | 0.35 | 0.31 | 0.27 | 0.23 |

Axle Friction Brake Bias Capacity Map 154

Axle Friction Brake Temperature Increase Rate (°C per second)

| Axle Friction Brake Temperature (°C) | 0 | 1 | 2 | 3 | 4 | 5 |
|---|---|---|---|---|---|---|
| 65 | 1 | 1 | 1 | 1 | 1 | 1 |
| 70 | 1 | 1 | 1 | 1 | 1 | 1 |
| 75 | 1 | 1 | 1 | 1 | 1 | 1 |
| 80 | 1 | 1 | 1 | 1 | 1 | 1 |
| 85 | 1 | 1 | 1 | 1 | 1 | 1 |
| 90 | 1 | 1 | 1 | 1 | 1 | 1 |
| 95 | 1 | 1 | 1 | 1 | 1 | 1 |
| 100 | 1 | 1 | 1 | 1 | 1 | 1 |
| 105 | 1 | 1 | 1 | 1 | 1 | 0.75 |
| 110 | 1 | 1 | 1 | 0.75 | 0.75 | 0.5 |
| 115 | 1 | 1 | 0.75 | 0.5 | 0.5 | 0.25 |
| 120 | 1 | 0.75 | 0.5 | 0.25 | 0.25 | 0 |
| 125 | 0.75 | 0.5 | 0.25 | 0 | 0 | 0 |
| 130 | 0 | 0 | 0 | 0 | 0 | 0 |

DYNAMIC DETERMINATION OF BLENDED AXLE SPLIT FOR BRAKING

TECHNICAL FIELD

The present disclosure relates to braking systems of a machine and, more particularly, to a system for dynamically determining how braking torque applied during a braking operation is split between braking systems associated with different axles of the machine.

BACKGROUND

Machines, such as haul trucks and other work machines, may perform various activities at worksite, such as a mine site, construction site, or other type of worksite. As an example, a haul truck may be loaded with material at a first location at a worksite, and may transport the material to a second location at the worksite.

A haul truck or other machine may have multiple braking systems, such as electric brakes associated with an electric motor and/or other electrical components of the machine, mechanical friction brakes of the machine, and/or driveline brakes of the machine such as engine compression systems and driveline retarders. Such braking systems may apply torque during a braking operation to maintain a current speed of the machine, slow the machine, or stop the machine. Multiple axles of the machine may be associated with corresponding braking systems, such that braking systems associated with one or more of the axles may be used during a braking operation.

Various systems have been developed in the past to manage braking systems of machines. For example, U.S. Pat. No. 11,124,176 to Plianos et al. (hereinafter "Plianos") describes a system in which a battery electric vehicle (BEV) has electric traction machines associated with front and rear axles of the BEV. The system described by Plianos may control amounts of torque that are applied by different electric traction machines, associated with different axles, when the BEV performs acceleration operations and/or braking operations. However, although the system described by Plianos may manage torque applied by different electric traction machines associated with different axles of a BEV, the system described by Plianos may have limited abilities to manage other types of braking systems.

Examples of the present disclosure are directed to overcoming the deficiencies noted above.

SUMMARY

According to a first aspect of the present disclosure, a method is performed by a brake controller of a machine. The method includes determining braking torque associated with a braking operation to be performed by one or more of a set of braking systems of the machine. The set of braking systems includes electric brakes, front friction brakes associated with a front axle of the machine, and rear friction brakes associated with a rear axle of the machine. The method includes allocating the braking torque between an electric brake ratio and a friction brake ratio. The method includes determining a target friction brake split based on the electric brake ratio and a target machine axle split. The method includes determining an axle friction brake bias capacity based on sensor data indicating a temperature and a temperature increase rate associated with one of the front friction brakes or the rear friction brakes. The method includes determining a requested friction brake split based on the target friction brake split and the axle friction brake bias capacity. The method includes allocating, based on the requested friction brake split, the friction brake ratio between a front friction brake ratio and a rear friction brake ratio.

According to a second aspect of the present disclosure, a brake controller of a machine includes one or more processors and memory. The memory stores computer-executable instructions that, when executed by the one or more processors, cause the one or more processors to perform operations. The operations include determining braking torque associated with a braking operation to be performed by one or more of a set of braking systems of the machine. The set of braking systems includes electric brakes, front friction brakes associated with a front axle of the machine, and rear friction brakes associated with a rear axle of the machine. The operations include allocating the braking torque between an electric brake ratio and a friction brake ratio. The operations include determining a target friction brake split based on the electric brake ratio and a target machine axle split. The operations include determining an axle friction brake bias capacity based on sensor data indicating a temperature and a temperature increase rate associated with one of the front friction brakes or the rear friction brakes. The operations include determining a requested friction brake split based on the target friction brake split and the axle friction brake bias capacity. The operations include allocating, based on the requested friction brake split, the friction brake ratio between a front friction brake ratio and a rear friction brake ratio.

According to a third aspect of the present disclosure, a machine includes electric brakes, front friction brakes associated with a front axle, rear friction brakes associated with a rear axle, and a brake controller. The brake controller is configured to manage the electric brakes, the front friction brakes, and the rear friction brakes. The brake controller is configured to determine braking torque associated with a braking operation to be performed by the machine. The brake controller is configured to allocate the braking torque between an electric brake ratio and a friction brake ratio. The brake controller is configured to determine a target friction brake split based on the electric brake ratio and a target machine axle split. The brake controller is configured to determine an axle friction brake bias capacity based on sensor data indicating a temperature and a temperature increase rate associated with one of the front friction brakes or the rear friction brakes. The brake controller is configured to determine a requested friction brake split based on the target friction brake split and the axle friction brake bias capacity. The brake controller is configured to allocate, based on the requested friction brake split, the friction brake ratio between a front friction brake ratio and a rear friction brake ratio.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
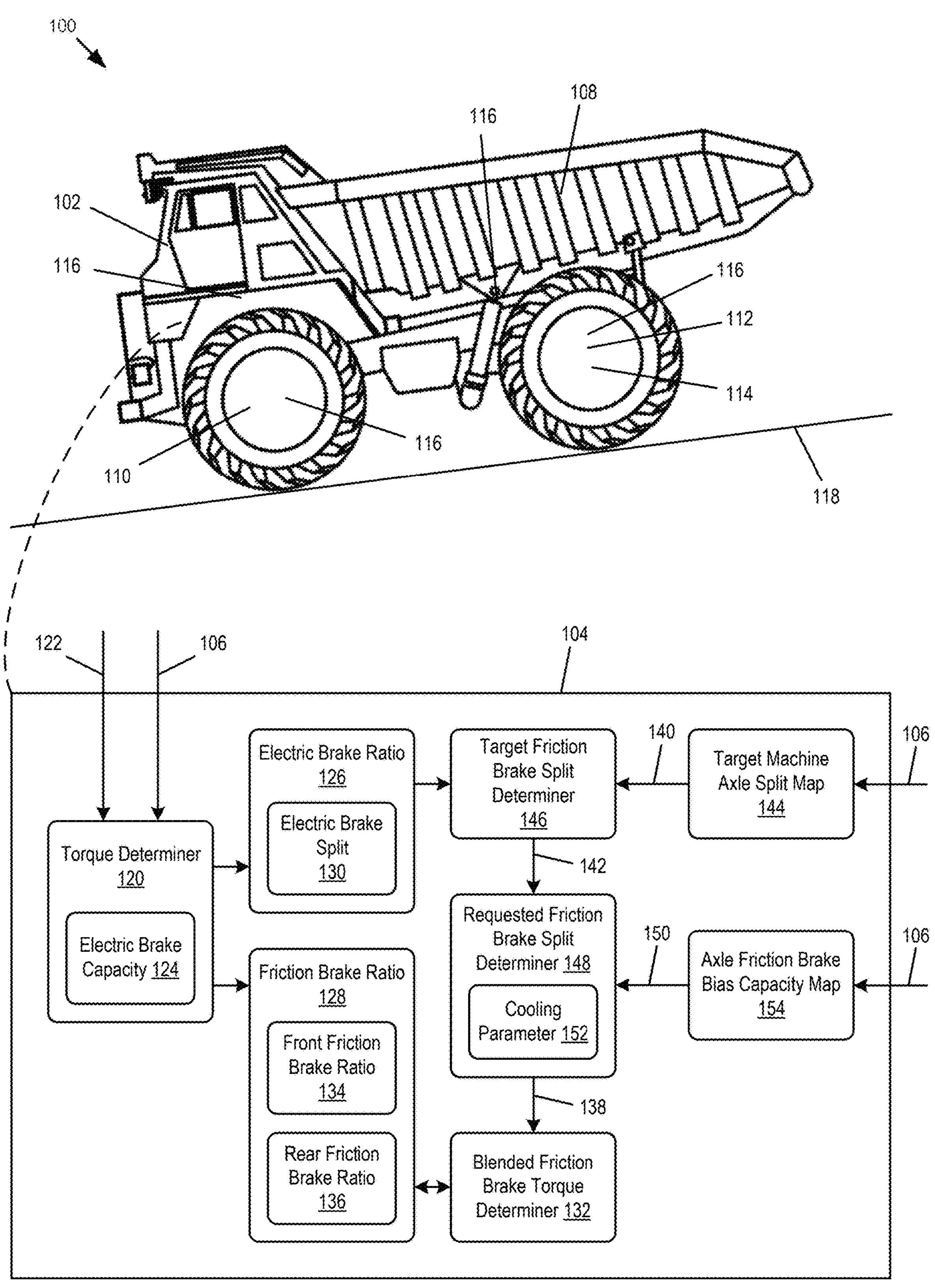
FIG. 1 shows an example of a dynamic braking system associated with a machine.

FIG. 1 shows an example of a dynamic braking system 100 associated with a machine 102. The dynamic braking system 100 includes a brake controller 104 configured to dynamically manage operations of braking systems of the machine 102. As described further below, the brake controller 104 may dynamically determine how much torque is to be applied via individual braking systems during a braking operation performed by the machine 102, based at least in part on sensor data 106 indicating an operating state of the machine 102. For example, the brake controller 104 may dynamically determine a blended axle split indicating portions of braking torque to be applied by one or more braking systems on a front axle of the machine 102 and by one or more braking systems on a rear axle of the machine 102.

The machine 102 may be a commercial or work machine, such as a mining machine, earth-moving machine, backhoe, scraper, dozer, loader (e.g., large wheel loader, track-type loader, etc.), shovel, truck (e.g., mining truck, haul truck, on-highway truck, off-highway truck, articulated truck, etc.), a crane, a pipe layer, farming equipment, or any other type of mobile machine or vehicle. The machine 102 may operate at, and/or travel around, a worksite, such as a mine site, a quarry, a construction site, or any other type of worksite or work environment.

The machine 102 may have a bed 108 and/or other elements that allow the machine 102 to transport material or other payloads. As an example, the machine 102 may be a haul truck, and material may be loaded into the bed 108 of the haul truck such that the haul truck may transport the material around a worksite or other location.

The machine 102 may be a manually-operated staffed machine, a semi-autonomous machine, or an autonomous machine. In examples in which the machine 102 is a staffed machine or a semi-autonomous machine, a human operator or driver may operate, control, or direct some or all of the functions of the machine 102. In examples in which the machine 102 is autonomous or semi-autonomous, functions of the machine 102, such as steering, speed adjustments, and/or other functions may be fully or partially controlled, automatically or semi-automatically, by on-board and/or off-board controllers or other computing devices associated with the machine 102.

As an example, the machine 102 may have an electronic control module (ECM) and/or other on-board computing devices that may fully or partially control operations of the machine 102. For instance, the machine 102 may have an on-board guidance system that may cause the machine 102 to drive and/or operate autonomously, an obstacle detection system that assists the on-board guidance system or that may alert a human operator of nearby objects detected by the obstacle detection system, and/or other systems that fully or partially control operations of the machine 102. As another example, an off-board computing device may receive data from the machine 102 and return instructions to the machine 102 through wireless networks or other data connections, for instance to dispatch the machine 102 to autonomously travel along an assigned route. As yet another example, an ECM or other on-board computing device may execute a cruise control system that is configured to cause the machine 102 to automatically accelerate and/or decelerate to maintain a target speed. For instance, the cruise control system may automatically invoke braking operations, via one or more braking systems of the machine 102, to maintain a target speed while the machine 102 travels downhill.

Figure 6:
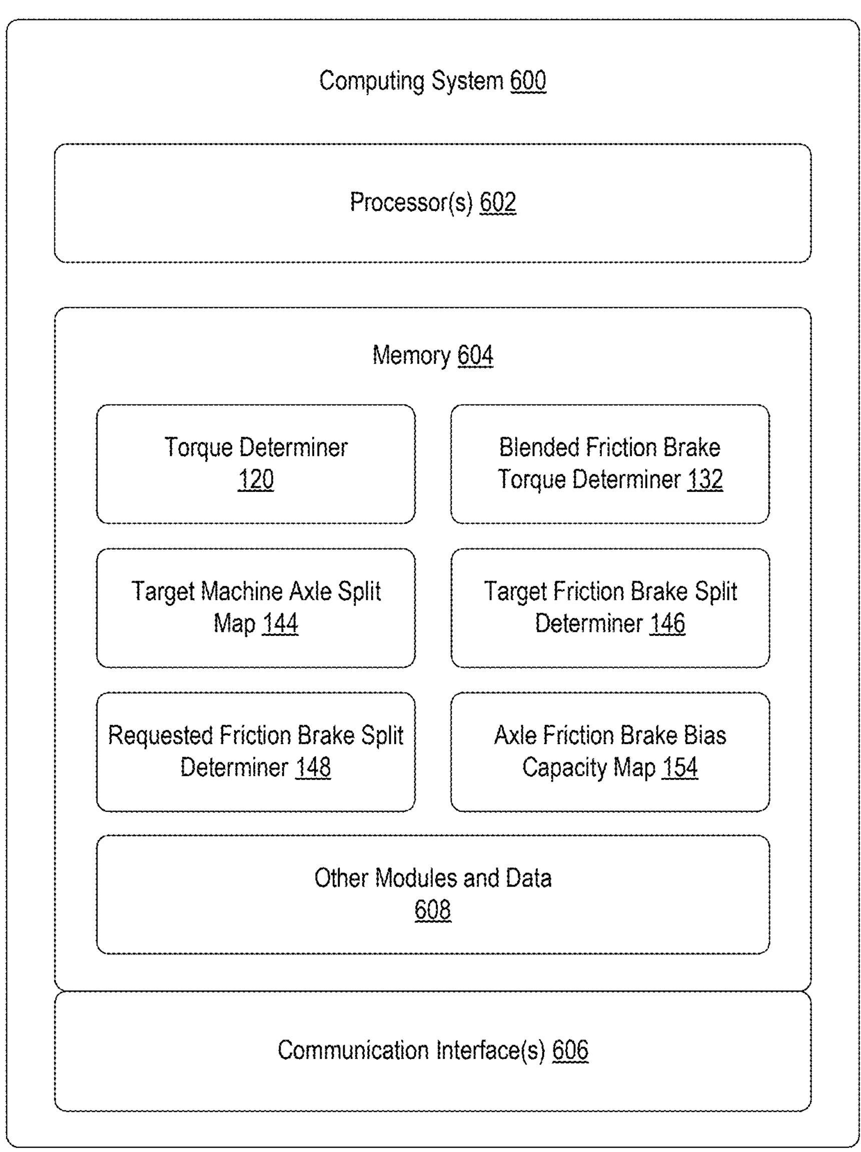
FIG. 6 shows an example system architecture for a computing system that executes one or more elements described herein.

The brake controller 104 described herein may be, or may be executed by, a computing system on-board the machine 102. For example, the brake controller 104 may be, or may be executed by, an ECM of the machine 102 and/or another computing system on-board the machine 102. In some examples, the computing system associated with the brake controller 104 may also execute other systems of the machine 102, and/or may send data to, and/or receive data from, other computing elements that execute other systems of the machine 102. FIG. 6, discussed further below, describes an example system architecture for a computing system associated with the brake controller 104.

The machine 102 may have an electric motor and/or other electrical components that are at least partially powered by a battery and/or other power sources. For instance, the machine 102 may be a battery electric machine (BEM), a hybrid machine, or another type of electric machine.

As an example, the machine 102 may be a BEM that is powered by one or more batteries. The batteries may include a lithium-ion (Li-ion) battery, a lithium-ion polymer battery, a nickel-metal hydride (NiMH) battery, a lead-acid battery, a nickel cadmium (Ni—Cd) battery, a zinc-air battery, a sodium-nickel chloride battery, or other type of battery that may at least partially power the machine 102.

In other examples, the machine 102 may be another type of machine that includes components powered by energy provided by a battery and/or connections to other power resources. For example, the machine 102 may use one or more electric drives for propulsion. Such electric drives of the machine 102 may be powered via one or more sources such as diesel fuel, a battery of the machine, and/or a connection to an external energy source. External energy sources may include a charging station, a trolley system that is configured to transfer electricity to the machine 102 as the machine 102 travels while connected to the trolley system, or any other external energy source.

The machine 102 has wheels on multiple axles, such as a front axle and a rear axle. In some examples, the machine 102 may have more wheels on the rear axle than on the front axle. For instance, the machine 102 may have two wheels on the front axle, and four wheels on the rear axle. Accordingly, weight of a payload carried in the bed 108, substantially above the rear axle, may be distributed among the larger number of wheels on the rear axle.

The machine 102 may have multiple braking systems. For example, the machine 102 may have electric brakes associated with an electric motor and/or other electrical components of the machine 102, mechanical friction brakes of the machine 102, driveline brakes of the machine 102, such as engine compression systems and driveline retarders, and/or other types of braking systems.

The braking systems of the machine 102 may include friction brakes associated with multiple axles of the machine 102. For example, the braking systems may include front friction brakes 110 associated with a front axle of the machine 102, and rear friction brakes 112 associated with a rear axle of the machine 102.

The braking systems of the machine 102 may also include electric brakes 114 associated with at least one of the axles of the machine 102. For instance, in some examples the electric brakes 114 may be associated with the rear axle of the machine 102, such that the rear friction brakes 112 and the electric brakes 114 may both be associated with the rear axle of the machine 102. In some examples, the machine 102 may have electric brakes 114 associated with both a front axle and a rear axle of the machine 102.

The machine 102 may use one or more braking systems, such as the front friction brakes 110, the rear friction brakes 112, and/or electric brakes 114 during braking operations. In some examples, a braking operation may be a deceleration operation that applies torque via one or more of the braking systems to slow the speed of the machine 102 and/or to stop the machine 102. In other examples, a braking operation may be a retarding operation that applies braking torque to maintain a current speed of the machine 102. For instance, if the machine 102 is traveling downhill and might otherwise accelerate downhill, the machine 102 may apply torque via one or more of the braking systems to prevent acceleration and thereby maintain the current speed of the machine 102.

The electric brakes 114 may be associated with an electric motor, battery, and/or other electrical elements of the machine 102. The electric brakes 114 may, for example, include a regenerative brake system that is configured to capture kinetic energy and/or potential energy during braking operations of the machine 102. Energy captured by the regenerative brake system may be stored in a battery of the machine 102, be used to power systems and/or operations of the machine 102, and/or be used for other purposes. In some examples, the electric brakes 114 may also, or alternately, be associated with a resistive system that is configured to uses resisters to dissipate energy captured during braking operations as heat. As an example, the resistive system may have a resistive grid with a coil that conducts electricity while fans blow air across the coil, such that the resistive coil may consume energy captured during a braking operation by converting the energy to heat.

The machine 102 may be configured to use the electric brakes 114 as a primary braking system. However, in some situations, the machine 102 may also use friction brakes, such as the front friction brakes 110 and/or the rear friction brakes 112, as a secondary braking system that supplements the electric brakes 114 and/or may be used in situations when the electric brakes 114 are not used.

As an example, if a battery of the machine 102 has a relatively high charge level, such that the battery does not have much available capacity to store energy captured by the electric brakes 114 during a braking operation, the machine 102 may use the electric brakes 114 during the braking operation to apply a relatively small amount of torque that causes the electric brakes 114 to capture a relatively small amount of energy that may be stored in the battery. However, the remainder of the torque associated with the braking operation may be applied by friction brakes, such as the front friction brakes 110 and/or the rear friction brakes 112.

As another example, if the machine 102 has electric brakes 114 on the rear axle, the machine 102 may use the front friction brakes 110 in combination with the rear electric brakes 114 in order to improve overall traction and/or controllability of the machine 102. For instance, usage of the front friction brakes 110 in addition to rear electric brakes 114 may improve overall traction and/or control of the machine 102, by causing braking systems on both the front axle and the rear axle of the machine 102 to be used concurrently.

The friction brakes, such as the front friction brakes 110 and/or the rear friction brakes 112, may be mechanical brakes that operate via mechanical components. The friction brakes may be part of a service brake system, such as a hydraulic braking system or other mechanical braking system. The friction brakes may operate mechanically by applying brake pads against rotors, by applying brake disks against plates through pistons, and/or by applying other mechanical operations to frictionally slow down wheels of the machine 102.

The machine 102 may have cooling systems that are configured to cool one or more of the braking systems. As an example, the machine 102 may have an active oil cooling system configured to cool the front friction brakes 110 and/or the rear friction brakes 112. As another example, the machine 102 may also, or alternately, have a passive air cooling system configured to cool the front friction brakes 110 and/or the rear friction brakes 112.

The machine 102 may have multiple types of sensors 116. The sensors 116 may, for example, include temperature sensors configured to measure or estimate temperatures associated with one or more braking systems, such as the front friction brakes 110, the rear friction brakes 112, and/or the electric brakes 114. Sensor data 106 captured via such temperature sensors may accordingly indicate current temperatures associated with one or more braking systems, and/or may indicate changes to the temperatures associated with one or more braking systems over time.

For example, as friction brakes apply brake pads against rotors to frictionally slow down wheels of the machine 102, heat generated by the friction may increase a temperature associated with the friction brakes. The sensors 116 may accordingly provide temperature data indicating temperatures of the friction brakes, and/or indicating whether the temperatures of the friction brakes are increasing, decreasing, or staying constant over time. For instance, the sensors 116 may determine a rate at which the temperatures of the friction brakes are increasing or decreasing.

The sensors 116 of the machine 102 may also include other types of sensors, such as payload sensors, incline and decline travel sensors, speed sensors, tire pressure sensors, battery sensors, cameras, LIDAR sensors, RADAR sensors, other optical sensors or perception systems, Global Positioning System (GPS) sensors or other location and/or positioning sensors, and/or other types of sensors. As an example, the sensors 116 may include a payload sensor configured to weigh a payload carried by the machine 102, such as a payload of material carried in the bed 108.

As another example, the sensors 116 may include an inertial measurement unit (IMU) or other sensor that may measure an orientation of the machine 102, and may accordingly indicate a grade of a ground surface 118 being traveled by the machine. For instance, an IMU may indicate a grade, such as a slope value or other angular value, of the ground surface 118. Grade information provided by the IMU may accordingly indicate whether the machine 102 is traveling downhill, uphill, or on flat ground, and/or indicate a degree of an incline or decline associated with the ground surface 118.

The sensors 116 may, in some examples, also include virtual sensors that are configured to estimate and/or enhance one or more types of sensor data 106. Such virtual sensors may be computer-implemented systems, such as physical models, machine learning systems, mapping tables, and/or other elements that may use sensor data from other sensors 116 and/or other data to estimate states of one or more components or systems of the machine 102. For example, virtual sensors may be used instead of, or in addition to, actual temperature sensors to estimate temperatures, and/or temperature changes over time, associated with one or more braking systems of the machine 102.

The brake controller 104 described herein may dynamically determine how much torque is to be applied via individual braking systems of the machine 102 during a braking operation, based at least in part on sensor data 106 provided by sensors 116 that indicates a current operating state of the machine 102. As discussed above, sensors 116 may capture or provide sensor data 106 indicating temperatures of one or more braking systems, changes in the temperatures of one or more braking systems over time, weight of a payload carried by the machine 102, grade information associated with the ground surface 118 on which the machine 102 is traveling, and/or other information.

The machine 102 may be configured to use electric brakes 114 on the rear axle as a primary braking system. However, in some situations the machine 102 may also, or alternately, use the front friction brakes 110 and/or the rear friction brakes 112 during the braking operation. As an example, the machine 102 may use the front friction brakes 110 and/or the rear friction brakes 112 instead of, or in addition to, the electric brakes 114 if an amount of torque associated with a braking operation exceeds an available capacity of the electric brakes 114. As another example, the machine 102 may use friction brakes on a first axle in addition to electric brakes 114 on a second axle, or otherwise use braking systems associated with both axles, to provide improved traction capabilities and/or to improve overall controllability of the machine 102 during braking operations. Accordingly, during such braking operations, the brake controller 104 may determine torque to be applied by the electric brakes 114 on the rear axle, and may determine torque to be applied by one or both of the front friction brakes 110 and the rear friction brakes 112.

In some situations in which the front friction brakes 110 and/or the rear friction brakes 112 are used to supplement primary electric brakes 114 on the rear axle, the brake controller 104 may determine that the front friction brakes 110 should apply more torque than the rear friction brakes 112. For instance, if sensor data 106 indicates that a temperature of the front friction brakes 110 does not exceed a threshold, and is not rising at more than a threshold rate, the brake controller 104 may determine to allocate all or a relatively large portion of remaining torque, not allocated to the primary electric brakes 114, to the front friction brakes 110. The brake controller 104 may accordingly allocate a smaller portion of the remaining torque, or no torque, to the rear friction brakes 112. Accordingly, in these situations, the front friction brakes 110 on the front axle and the electric brakes 114 on the rear axle may apply torque during the braking operation, while rear friction brakes 112 may not be used and/or may apply a lower amount of torque during the braking operation.

However, if sensor data 106 instead indicates that the temperature of the front friction brakes 110 is above a threshold and/or is rising at more than a threshold rate, the brake controller 104 may reduce the amount of torque allocated to the front friction brakes 110 in order to reduce and/or control the temperature of the front friction brakes 110. The brake controller 104 may also correspondingly increase the amount of torque allocated to the rear friction brakes 112 on the rear axle, for instance to compensate for the reduction in torque allocated to the front friction brakes 110.

The brake controller 104 may include a torque determiner 120 that is configured to determine how much torque is to be applied overall during a braking operation by one or more of the braking systems of the machine 102. The torque determiner 120 may receive a brake command 122 indicating a target speed of the machine 102. In some examples, the brake command 122 may be based on an operator command input by an operator of the machine 102, for instance via a brake pedal, a lever, or other type of control. In other examples, the brake command 122 may be an automated command provided by an autonomous driving system of the machine 102, a cruise control system of the machine 102, or another system of the machine 102.

The torque determiner 120 may also receive sensor data 106 indicating a current speed of the machine 102, a weight of a payload carried by the machine 102, a grade of the ground surface 118 on which the machine 102 is traveling, and/or other information. In some examples, the torque determiner 120 may also receive sensor data 106 and/or other information indicating a wheel speed differential between a speed of front wheels on the front axle of the machine 102 relative to a speed of rear wheels on the rear axle of the machine 102. If such a wheel speed differential exceeds a threshold, the wheel speed differential may indicate actual or potential traction and/or control issues associated with the machine 102, for instance because the rear wheels are rotating at a different speed than the front wheels.

Based on the brake command 122 and the sensor data 106, the torque determiner 120 may determine how much torque is to be applied by the machine 102 overall during the braking operation. As an example, if the target speed indicated by the brake command 122 is lower than the current speed of the machine 102, the torque determiner 120 may determine how much braking torque would slow the machine 102 from the current speed to the target speed. As another example, if the target speed indicated by the brake command 122 is the same as the current speed of the machine 102, the torque determiner 120 may determine how much braking torque would prevent acceleration of the machine 102 and would allow the machine 102 to maintain its current speed. The torque determiner 120 may determine a torque amount associated with a braking operation based on a difference between the target speed and the current speed, as well as based on other factors such as the weight and/or mass of the machine 102, a combined weight and/or mass of the machine 102 and a payload being carried by the machine 102, if any, a grade of the ground surface 118 being traveled by the machine 102, and/or other factors. For instance, if the machine 102 is loaded with a heavy load and/or is traveling downhill, an amount of torque associated with a braking operation may be higher than if the machine 102 is unloaded and/or is traveling uphill or on flat ground.

The torque determiner 120 may in some examples determine how much of the overall torque associated with a braking operation should be applied by one or more braking systems associated with the rear axle, relative to one or braking systems associated with the front axle. For example, if sensor data 106 or other input data indicates that a wheel speed differential between a speed of wheels on the front axle relative to a speed of wheels on the rear axle exceeds a threshold, such that the wheels on one of the axles may slipping relative to wheels on the other axle, the torque determiner 120 may determine that at least one braking system on the front axle should be used in combination with at least one braking system on the rear axle in order to provide improved traction and/or control of the machine 102.

The torque determiner 120 may also determine an electric brake capacity 124 of the electric brakes 114, for instance based on sensor data 106 received from sensors 116 associated with the electric brakes 114, a battery of the machine 102, and/or other sensors 116. The torque determiner 120 may use the electric brake capacity 124 to determine whether the electric brakes 114 currently have the capacity to apply the full torque amount associated with a requested braking operation, or whether the electric brakes 114 currently have the capacity to apply a portion of the full amount of torque that is allocated to an axle associated with the electric brakes 114. The electric brake capacity 124 may be based on a current capacity of the electric brakes 114 to apply torque, based on a current capacity of a battery and/or other electrical systems to store or otherwise use energy captured via the electric brakes 114 when the electric brakes 114 apply torque, and/or based on other factors. For example, if a charge level of a battery of the machine 102 is relatively low, the electric brake capacity 124 may be relatively high. However, if the charge level of the battery is relatively high, the electric brake capacity 124 may be relatively low because the battery has a relatively low capacity to store energy that could otherwise be captured by the electric brakes 114.

The torque determiner 120 may determine an electric brake ratio 126 and/or a friction brake ratio 128 based on the current electric brake capacity 124, a wheel speed differential between a speed of front wheels relative to a speed of rear wheels, and/or other factors. The electric brake ratio 126 may indicate how much of a full torque amount associated with a braking operation could be, and/or is to be, applied by the electric brakes 114. The electric brake ratio 126 may indicate how much of a full torque amount associated with the braking operation is to be applied by one or more friction brake systems, such as the front friction brakes 110 and/or the rear friction brakes 112. The friction brake ratio 128 may indicate a remaining portion of the full torque amount that is not allocated to the electric brakes 114 via the electric brake ratio 126.

For example, if the electric brake capacity 124 indicates that the electric brakes 114 currently have the capacity to apply a full torque amount associated with a braking operation, the brake controller 104 may determine not to use friction brakes during the braking operation. The brake controller 104 may accordingly set the electric brake ratio 126 to 100%, and set the friction brake ratio 128 to 0%.

However, if the electric brake capacity 124 indicates that the electric brakes 114 do not currently have the capacity to apply a full torque amount associated with a braking operation, and/or that a wheel speed differential exceeds a threshold value, the brake controller 104 may determine to use friction brakes during the braking operation in addition to, and/or instead of, the electric brakes 114. For instance, in this situations the brake controller 104 may set the electric brake ratio 126 to a value that is less than 100%, and set the friction brake ratio 128 based on a remainder of the full torque amount that is not allocated to the electric brakes. As a non-limiting example, if the electric brake ratio 126 indicates that the electric brakes 114 are to apply 70% of the full torque amount associated with a braking operation, the friction brake ratio 128 may indicate that friction brakes are to apply the remaining 30% of the full torque amount associated with the braking operation.

As another example, sensor data 106 may indicate that a wheel speed differential exceeds a threshold value, such that the rear wheels may be slipping relative to the front wheels, or vice versa. In this example, the machine 102 may have electric brakes 114 on the rear axle, but not have electric brakes 114 on the front axle. Accordingly, the brake controller 104 may determine that the front friction brakes 110 should be used in addition to the rear electric brakes 114 in order to provide improved traction and/or control by allocating portions of the overall braking torque to braking systems on both axles. Accordingly, in this example, the machine 102 may set the electric brake ratio 126 to a first portion of the overall braking torque that is to be applied by the rear electric brakes 114, and set the friction brake ratio 128 to a remaining second portion of the overall braking torque. As described further below, in some situations the second portion of the overall braking torque, not allocated to the rear electric brakes 114, may be applied by the front friction brakes 110. However, if temperature information indicates that temperatures of the front friction brakes 110 are too high and/or increasing too quickly, the portion of the overall braking torque not allocated to the rear electric brakes 114 may be applied by a combination of the front friction brakes 110 and the rear friction brakes 112.

The electric brake ratio 126, and/or elements of the brake controller 104, may indicate an electric brake split 130. The electric brake split 130 may indicate how much of the electric brake ratio 126 is associated to be associated with electric brakes 114 on the front axle, relative to electric brakes 114 on the rear axle. In some examples, the machine 102 may have electric brakes 114 on the front axle and on the rear axle. Accordingly, the electric brake split 130 may be set to 50% to indicate that half of the torque applied by electric brakes 114 overall during a braking operation should be applied by front electric brakes 114 and the other half of the torque applied by electric brakes 114 overall during a braking operation should be applied by rear electric brakes 114. An electric brake split 130 above or below 50% may indicate that the overall amount of torque to be applied by electric brakes 114 during a braking operation should be allocated unequally among front electric brakes 114 and rear electric brakes 114. Higher values of the electric brake split 130 may indicate more usage of electric brakes 114 on the front axle, while lower values of the electric brake split 130 may indicate more usage of electric brakes 114 on the rear axle.

If the machine 102 has electric brakes 114 on both axles, the electric brake split 130 may be set to 0% to indicate that only the electric brakes 114 on the rear axle should be used, or may be set to 100% to indicate that only the electric brakes 114 on the front axle should be used. Similarly, if the machine 102 only has electric brakes 114 on one axle, the electric brake split 130 may be set to a corresponding value to indicate that all of the overall amount of torque to be applied by electric brakes 114 during a braking operation should be applied by that set of electric brakes 114. For example, if the machine 102 only has electric brakes 114 on the rear axle, the electric brake split 130 may be set to 0% to indicate that the rear electric brakes 114 should apply all of the overall amount of torque to be applied by electric brakes 114 during a braking operation. As discussed above, in this situation in which the machine 102 only has electric brakes 114 on the rear axle and does not have electric brakes 114 on the front axle, the electric brake ratio 126 indicated by the torque determiner 120 may indicate a portion of an overall amount of braking torque that is to be applied by the electric brakes 114 on the rear axle.

The electric brake ratio 126 being less than 100% and the friction brake ratio 128 being above 0% indicates that the torque determiner 120 has determined, based on the current electric brake capacity 124, a wheel speed differential, the overall amount of torque to be applied during a braking operation, and/or factors, that friction brakes should be used in addition to, or instead of, electric brakes 114 during the braking operation. In such situations, a blended friction brake torque determiner 132 of the brake controller 104 may allocate portions of the friction brake ratio 128 among a front friction brake ratio 134 and a rear friction brake ratio 136. Accordingly, while the friction brake ratio 128 may indicate a portion of the overall amount of torque to be applied during a braking operation that should be handled by friction brakes overall, the front friction brake ratio 134 may indicate how much of the overall amount of torque is to be applied by the front friction brakes 110 during the braking operation. The rear friction brake ratio 136 may similarly indicate how much of the overall amount of torque is to be applied by the rear friction brakes 112 during the braking operation.

In some situations, the blended friction brake torque determiner 132 may determine that, based on the current operating state of the machine 102, the front friction brakes 110 should be used without the rear friction brakes 112. Accordingly, the blended friction brake torque determiner 132 may indicate that the front friction brake ratio 134 is equal to the friction brake ratio 128, and that the rear friction brake ratio 136 is 0%.

In other situations, the blended friction brake torque determiner 132 may determine that, based on current operating state of the machine, the rear friction brakes 112 should be used without the front friction brakes 110. Accordingly, the blended friction brake torque determiner 132 may indicate that the rear friction brake ratio 136 is equal to the friction brake ratio 128, and that the front friction brake ratio 134 is 0%.

In still other situations, the blended friction brake torque determiner 132 may determine that the friction brake ratio 128 should be allocated between the front friction brake ratio 134 and the rear friction brake ratio 136, such that both the front friction brakes 110 and the rear friction brakes 112 are used during a braking operation. As a non-limiting example, if the friction brake ratio 128 is 50%, thereby indicating that friction brakes are to apply 50% of the overall torque associated with a braking operation, the blended friction brake torque determiner 132 may determine that the front friction brake ratio 134 is 35% and the rear friction brake ratio 136 is 15%. Accordingly, a sum of the front friction brake ratio 134 and the rear friction brake ratio 136 may be equal to the overall friction brake ratio 128.

The blended friction brake torque determiner 132 may use a requested friction brake split 138 to determine how to allocate the overall friction brake ratio 128 between the front friction brake ratio 134 and the rear friction brake ratio 136. Higher values of the requested friction brake split 138 may indicate that the front friction brake ratio 134 should be larger portions of the friction brake ratio 128, while lower values of the requested friction brake split 138 may indicate that the front friction brake ratio 134 should be smaller portions of the friction brake ratio 128. As a non-limiting example, a requested friction brake split 138 of 75% may indicate that the front friction brake ratio 134 should be 75% of the friction brake ratio 128, and that the rear friction brake ratio 136 should be the remaining 25% of the friction brake ratio 128.

The requested friction brake split 138 may be dynamically determined by the brake controller 104 based on sensor data 106 and/or other information indicating a current operating state of the machine 102. For example, the brake controller 104 may dynamically determine the requested friction brake split 138 based on factors such as a temperature of the front friction brakes 110, a rate of change in the temperature of the front friction brakes 110, a weight of a payload carried by the machine 102, a grade of the ground surface 118 being traveled by the machine 102, the electric brake ratio 126, the electric brake split 130, and/or other factors. Accordingly, as such factors change over time, the requested friction brake split 138 may also change over time. For instance, the requested friction brake split 138 may change if the machine 102 had been traveling on flat ground but begins traveling downhill, if the machine 102 had been unloaded but the bed 108 is loaded with a payload of material, if the temperature of the front friction brakes 110 increases at more than a threshold rate and/or begins to exceed a threshold temperature, and/or if there are other changes to the operating state of the machine 102.

As described further below, the brake controller 104 may use sensor data 106 to determine a target machine axle split 140 indicating a target split between usage of all braking systems on the front axle of the machine 102 relative to all braking systems on the rear axle of the machine 102 based on current operating conditions. The brake controller 104 may also use the target machine axle split 140 to determine a target friction brake split 142 that indicates a target split between usage of the front friction brakes 110 relative to the rear friction brakes 112 under optimal or ideal conditions. The target friction brake split 142 may accordingly be a target split value that could be used to allocate the friction brake ratio 128 between the front friction brake ratio 134 and the rear friction brake ratio 136 under optimal or ideal conditions, such as when the temperatures of the front friction brakes 110 are relatively cool and/or are not rising quickly.

However, although the target friction brake split 142 may be associated with optimal or ideal conditions, the machine 102 may not be operating under those optimal or ideal conditions. For instance, the temperatures of the front friction brakes 110 may hotter than a threshold temperature, and/or may be rising more quickly than a threshold rate. Accordingly, in some situations the requested friction brake split 138 determined by the brake controller 104 may differ from the target friction brake split 142.

As a non-limiting example, the target friction brake split 142 may indicate that ideally the front friction brakes 110 would apply 66% of braking torque that the torque determiner 120 allocates to the friction brakes. However, the requested friction brake split 138 may instead indicate that the front friction brakes 110 should apply only 58% of the braking torque allocated to the friction brakes. Accordingly, allocating 58% of that torque to the front friction brakes 110 based on the requested friction brake split 138, instead of allocating 66% of that torque to the front friction brakes 110 based on the target friction brake split 142, may help control or manage the temperatures of the front friction brakes 110 while still allowing the front friction brakes 110 and the rear friction brakes 112 to together provide the full amount of torque allocated to the friction brakes.

Figure 2:
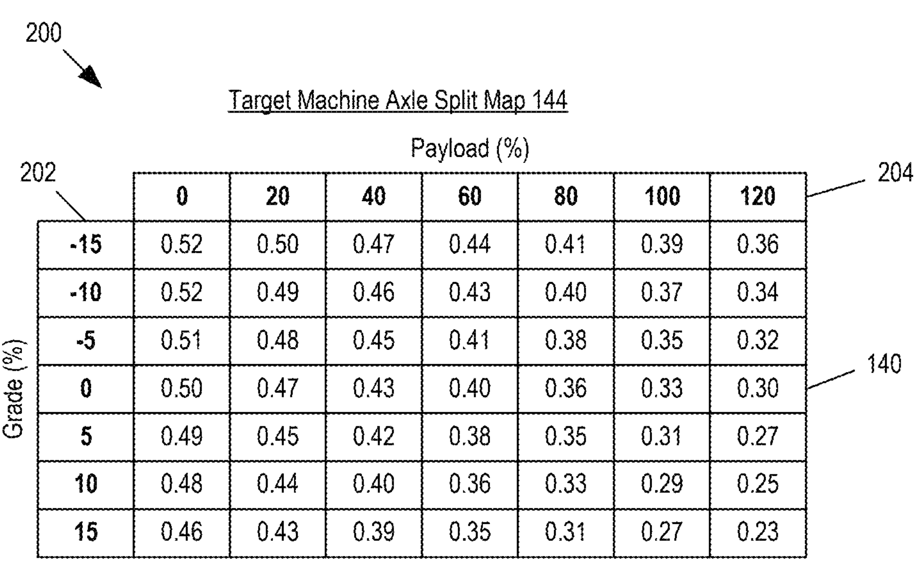
FIG. 2 shows an example of a target machine axle split map.

The brake controller 104 may use a target machine axle split map 144 to determine the target machine axle split 140 based on sensor data 106 indicating first factors associated with a current operating state of the machine 102. The first factors may include a weight of a payload carried by the machine 102, and a grade of the ground surface 118 being traveled by the machine 102, as discussed further below. The target machine axle split map 144 may be a predetermined map or lookup table of values that correspond to values indicated by sensor data 106. An example of the target machine axle split map 144 is shown in FIG. 2, and is discussed further below with respect to that figure.

However, in other examples, the brake controller 104 may use other models, formulas, or techniques to dynamically determine the target machine axle split 140 based on the values indicated by sensor data 106. For example, the brake controller 104 may determine or modify the target machine axle split 140 based in part on a wheel speed differential. Accordingly, if such a wheel speed differential indicates that there may be slippage between a speed of front wheels relative to a speed of the rear wheels that may cause traction and/or machine control issues, the brake controller 104 may adjust the target machine axle split 140 to indicate an optimal split between usage of all braking systems on the front axle of the machine 102 relative to all braking systems on the rear axle of the machine 102 that may provide improved traction and/or machine control.

The target machine axle split 140 may be a value, such as a percentage or a corresponding value on a scale of 0 to 1, that indicates a target split between usage of braking systems associated with the front axle relative to braking systems on the rear axle. The target machine axle split 140 may represent an overall split between braking systems on each axle of the machine 102, regardless of the types of braking systems that are associated with each of the axles.

For instance, the target machine axle split 140 may indicate a percentage of torque to be applied during a braking operation via braking systems on the front axle, such as the front friction brakes 110 and/or front electric brakes 114. The target machine axle split 140 may accordingly indicate that a remainder of the torque to be applied during the braking operation, that is not applied by braking systems on the front axle, may be applied by via braking systems on the rear axle, such as rear electric brakes 114 and/or the rear friction brakes 112.

Accordingly, the target machine axle split 140 may indicate how an overall amount of torque associated with a braking operation may be allocated between braking systems on the front axle and the rear axle. Higher values of the target machine axle split 140 may indicate a preference for braking systems on the front axle to apply larger percentages of the torque than braking systems on the rear axle. Similarly, lower values of the target machine axle split 140 may indicate a preference for braking systems on the front axle to apply lower percentages of the torque than braking systems on the rear axle, while a target machine axle split 140 of 50% or 0.5 may indicate a preference for braking systems on both axles to apply equal percentages of torque during a braking operation.

The target machine axle split 140 may accordingly indicate a target or preferred split between usage of all braking systems on the front axle relative to all braking systems on the rear axle based on some attributes of current operating conditions. However, as described herein, the brake controller 104 may use the target machine axle split 140 and other data to determine the requested friction brake split 138 that is used to determine the front friction brake ratio 134 and the rear friction brake ratio 136 that is actually used during a braking operation. Accordingly, the front friction brake ratio 134 determined based on the requested friction brake split 138 may indicate that the front friction brakes 110 are to apply more or less torque than the target machine axle split 140 may otherwise indicate should be applied by braking systems on the front axle.

The brake controller 104 may use the target machine axle split map 144 and/or other systems to determine the target machine axle split 140, based on sensor data 106 indicating the weight of a payload carried by the machine 102 and a grade of the ground surface 118 being traveled by the machine 102. Such factors may impact the center of gravity of the machine 102 and/or the load distribution between axles of the machine 102. For example, as shown in FIG. 2, if the weight of a payload carried by the machine 102 increases, and/or the grade of the ground surface 118 being traveled increases, the target machine axle split map 144 may indicate that the target machine axle split 140 decreases such that braking systems on the front axle should ideally apply a smaller percentage of braking torque, and that braking systems on the rear axle should ideally apply a greater percentage of braking torque. However, if the weight of a payload carried by the machine 102 decreases and/or the grade of the ground surface 118 being traveled decreases, the target machine axle split map 144 may indicate that the target machine axle split 140 increases, such that braking systems on the front axle should apply a greater percentage of braking torque and braking systems on the rear axle should apply a smaller percentage of braking torque.

As discussed above, the target machine axle split 140 may indicate a target or preferred split between usage of all braking systems on the front axle relative to all braking systems on the rear axle regardless of the types of braking systems that are used. However, the brake controller 104 may also a determine a corresponding target friction brake split 142 that is associated with friction brakes in particular. The target friction brake split 142 may indicate a target or preferred split between usage of the front friction brakes 110 relative to the rear friction brakes 112.

The brake controller 104 may have a target friction brake split determiner 146 or other element that is configured to determine the target friction brake split 142 based on the target machine axle split 140 and based on other factors, such as the electric brake ratio 126 and/or the electric brake split 130. For example, the target friction brake split determiner 146 may identify the current target machine axle split 140 determined via the target machine axle split map 144 based on sensor data 106 indicating weight of a payload carried by the machine 102 and the grade of the ground surface 118 being traveled by the machine 102. The target friction brake split determiner 146 may also identify the electric brake ratio 126 determined by the torque determiner 120 based on the current electric brake capacity 124, a wheel speed differential, a torque amount associated with a requested braking operation, and/or other factors. The target friction brake split determiner 146 may also identify the electric brake split 130 associated with the electric brake ratio 126. The target friction brake split determiner 146 may use the target machine axle split 140, the electric brake ratio 126, and/or the electric brake split 130 to determine the target friction brake split 142.

In some examples, the target friction brake split determiner 146 may be configured to determine the target friction brake split 142 using the following formula: $A=\max(0, \min(1, (B-(C*D))/(1-D)))$. In this formula, A is the target friction brake split 142, B is the target machine axle split 140, C is the electric brake split 130, and D is the electric brake ratio 126.

As a first example, the target machine axle split 140 (B) determined via the target machine axle split map 144 may be 0.33, indicating that, based on current grade and payload information, 33% of the braking torque associated with a braking operation would ideally be applied by brakes on the front axle. In this example, the electric brake split 130 (C) may be 0 and the electric brake ratio 126 (D) may be 0.9, indicating that only rear electric brakes 114 are to be used, that the rear electric brakes 114 are set to apply 90% of the overall amount of torque during the braking operation, and that friction brakes are set to apply the remaining 10% of the overall amount of torque during the braking operation. The target friction brake split determiner 146 may use these values in the above formula to determine that the target friction brake split 142 (A) is 1, indicating that the front friction brakes 110 should ideally apply 100% of the 10% of the overall torque that has been allocated to friction brakes, while the rear friction brakes 112 should ideally apply 0% of the 10% of the overall torque that has been allocated to friction brakes.

As a second example, the target machine axle split 140 (B) determined via the target machine axle split map 144 may be 0.33, indicating that, based on current grade and payload information, 33% of the braking torque associated with a braking operation would ideally be applied by brakes on the front axle. In this example, the electric brake split 130 (C) may be 0 and the electric brake ratio 126 (D) may be 0.2, indicating that only rear electric brakes 114 are to be used, that the rear electric brakes 114 are set to apply 20% of the overall amount of torque during the braking operation, and that friction brakes are set to apply the remaining 80% of the overall amount of torque during the braking operation. The target friction brake split determiner 146 may use these values in the above formula to determine that the target friction brake split 142 (A) is 0.4125, indicating that the front friction brakes 110 should ideally apply 41.25% of the 80% of the overall torque that has been allocated to friction brakes, while the rear friction brakes 112 should ideally apply the remaining 58.75% of the 80% of the overall torque that has been allocated to friction brakes.

As a third example, the target machine axle split 140 (B) determined via the target machine axle split map 144 may be 0.33, indicating that, based on current grade and payload information, 33% of the braking torque associated with a braking operation would ideally be applied by brakes on the front axle. In this example, the electric brake split 130 (C) may be 0.5 and the electric brake ratio 126 (D) may be 0.5, indicating that front electric brakes 114 and rear electric brakes 114 are ideally to be used equally, that the front and rear electric brakes 114 are together set to apply 50% of the overall amount of torque during the braking operation, and that friction brakes are set to apply the remaining 50% of the overall amount of torque during the braking operation. The target friction brake split determiner 146 may use these values in the above formula to determine that the target friction brake split 142 (A) is 0.16, indicating that the front friction brakes 110 should ideally apply 16% of the 50% of the overall torque that has been allocated to friction brakes, while the rear friction brakes 112 should ideally apply the remaining 84% of the 50% of the overall torque that has been allocated to friction brakes.

As discussed above, although the target friction brake split 142 may indicate a target or preferred split between usage of the front friction brakes 110 relative to the rear friction brakes 112, ideal conditions in which the target friction brake split 142 should be used may or may not exist. Accordingly, the brake controller 104 may use a requested friction brake split determiner 148 or other elements to generate the requested friction brake split 138 that is to be used by the blended friction brake torque determiner 132. The requested friction brake split determiner 148 or other elements of the brake controller 104 may generate the requested friction brake split 138 based on the target friction brake split 142, an axle friction brake bias capacity 150, and/or a cooling parameter 152, as described further below.

In some examples, the requested friction brake split 138 may be equal to the target friction brake split 142. However, in other situations, the requested friction brake split 138 may be different than the target friction brake split 142. For example, if the temperatures of the front friction brakes 110 exceed a threshold temperature and/or are rising at more than a threshold rate, the requested friction brake split 138 may be lower than the target friction brake split 142.

Figure 3:
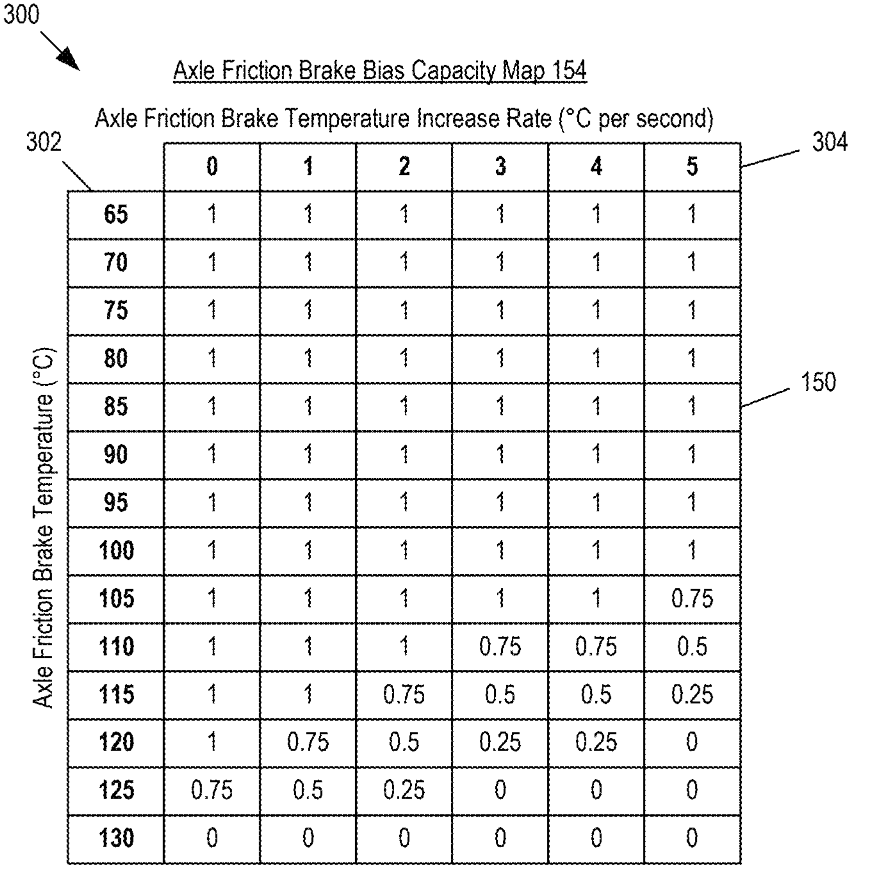
FIG. 3 shows an example of an axle friction brake bias capacity map.

The brake controller 104 may use an axle friction brake bias capacity map 154 to determine the axle friction brake bias capacity 150 based on sensor data 106 indicating second factors associated with a current operating state of the machine 102. The second factors may be different factors than the first factors used to the determine the target machine axle split 140 based on the target machine axle split map 144. For example, the second factors used to determine the axle friction brake bias capacity 150 based on the axle friction brake bias capacity map 154 may include a current temperature associated with the front friction brakes 110, and a current rate of a temperature rise associated with the front friction brakes 110, as discussed further below. The axle friction brake bias capacity map 154 may be a predetermined map or lookup table of values that correspond to values indicated by sensor data 106. An example of the axle friction brake bias capacity map 154 is shown in FIG. 3, and is discussed further below with respect to that figure.

However, in other examples, the brake controller 104 may use other models, formulas, or techniques to dynamically determine the axle friction brake bias capacity 150 based on the values indicated by sensor data 106. For example, the brake controller 104 may determine or modify the axle friction brake bias capacity 150 based in part on a wheel speed differential. Accordingly, if such a wheel speed differential indicates that there may be slippage between a speed of front wheels relative to a speed of the rear wheels that may cause traction and/or machine control issues, the brake controller 104 may adjust the axle friction brake bias capacity 150 to indicate a higher capacity for bias towards the front friction brakes 110 relative to the rear friction brakes 112. Such a higher capacity for bias towards the front friction brakes 110 relative to the rear friction brakes 112 may indicate a preference towards relatively balanced usage of the front friction brakes 110 and rear electric brakes 114, which may provide improved traction and machine control relative to lower usage of the front friction brakes 110 and higher usage of the rear friction brakes 110 in combination with rear electric brakes 114.

The axle friction brake bias capacity 150 may be a value, such as a percentage or a value on a scale of 0 to 1, that indicates a capacity for a bias towards usage of friction brakes on one axle relative to usage of friction brakes on a different axle. As an example, the axle friction brake bias capacity 150 may be a front friction brake bias capacity indicating a capacity for a bias towards the front friction brakes 110 relative to the rear friction brakes 112. In this example, higher values of the axle friction brake bias capacity 150 may indicate that the front friction brakes 110 may handle more braking torque than the rear friction brakes 112, while lower values of the front friction brake bias capacity 150 may indicate that torque should be more evenly distributed between the front friction brakes 110 and the rear friction brakes 112.

For example, an axle friction brake bias capacity 150 of 0% may indicate that there is no capacity for bias towards the front friction brakes 110 relative to the rear friction brakes 112, such that the front friction brakes 110 and the rear friction brakes 112 should apply the same amount of torque during braking operations. However, an axle friction brake bias capacity 150 of 100% may indicate that there is full capacity for bias towards the front friction brakes 110 relative to the rear friction brakes 112. An axle friction brake bias capacity 150 between 0% and 100% may accordingly indicate a corresponding amount of capacity for bias towards the front friction brakes 110 relative to the rear friction brakes 112.

As discussed above, in some examples the axle friction brake bias capacity 150 may be a front friction brake bias capacity that indicates a capacity for bias towards the front friction brakes 110 relative to the rear friction brakes 112 are described herein. For example, a front friction brake bias capacity may be used if there are friction brakes on both axles, but electric brakes only on the rear axle, and/or in other situations. However, in other examples the axle friction brake bias capacity 150 may indicate a different capacity for bias between braking systems on different axles. For example, if the machine 102 has electric brakes on the front axle and not on the rear axle, or has electric brakes on both axles, there may be capacity for bias towards usage of the rear friction brakes 112 relative to the front friction brakes 110, instead of or in addition to capacity for bias towards the front friction brakes 110 relative to the rear friction brakes 112. Accordingly, in some examples the axle friction brake bias capacity 150 may indicate a capacity for bias towards the rear friction brakes 112 relative to the rear friction brakes 110, or may indicate another type of bias capacity associated with one or more types of braking systems on the front axle relative to one or more types of braking systems on the rear axle.

The brake controller 104 may use the axle friction brake bias capacity map 154 and/or other systems to determine the axle friction brake bias capacity 150, based on sensor data 106 indicating a current temperature associated with friction brakes on one of the two axles of the machine 102, and a current rate of a temperature rise associated with those friction brakes. For example, if the axle friction brake bias capacity 150 is a front friction brake bias capacity that indicates a capacity for bias towards the front friction brakes 110 relative to the rear friction brakes 112, the brake controller 104 may determine the axle friction brake bias capacity 150 based on sensor data 106 indicating a current temperature and a current temperature rise associated with the front friction brakes 110.

In some examples, as shown in FIG. 3, if the temperature of the friction brakes on one axle increases, and/or the rate of an increase to the temperatures of those friction brakes increases, the axle friction brake bias capacity map 154 may indicate that the axle friction brake bias capacity 150 associated with those friction brakes decreases. For example, if the axle friction brake bias capacity 150 is a front friction brake bias capacity, and the front friction brakes 110 experience high temperatures and/or quick rises in temperatures, the axle friction brake bias capacity 150 determined via the axle friction brake bias capacity map 154 may indicate that there is less capacity for bias towards the front friction brakes 110 relative to the rear friction brakes 112.

As discussed above, the requested friction brake split determiner 148 or other elements of the brake controller 104 may determine the requested friction brake split 138 that is to be used by the blended friction brake torque determiner 132. The requested friction brake split 138 may be determined based on the target friction brake split 142, the axle friction brake bias capacity 150, and/or a value of a cooling parameter 152. The target friction brake split 142 may be determined based on the target machine axle split 140 determined via the target machine axle split map 144, the electric brake ratio 126, and/or the electric brake split 130, as described above. The axle friction brake bias capacity 150 may be determined via the axle friction brake bias capacity map 154. The cooling parameter 152 may indicate an ideal or optimal balance between cooling systems associated with the front friction brakes 110 and the rear friction brakes 112, for instance based on machine architecture attributes such as a cooling flow rate, a cooler size, a cooler location, and/or other attributes. As an example, the cooling parameter 152 may be set to 50%, to indicate that ideally the front friction brakes 110 and the rear friction brakes 112 should have a 50% torque split to have an equal balance of heat loads and cooling and to achieve equal component temperatures.

In some examples, the requested friction brake split determiner 148 may be configured to determine the requested friction brake split 138 using the following formula: $E=(A*F)+((1-F)*G)$. In this formula, E is the requested friction brake split 138, A is the target friction brake split 142, F is the axle friction brake bias capacity 150, and G is the cooling parameter 152.

As a first example, the target friction brake split 142 (A) determined may be 1, indicating that the front friction brakes 110 would ideally apply all of the braking torque allocated to friction brakes and that the rear friction brakes 112 would ideally not apply any of the braking torque allocated to friction brakes. In this example, the axle friction brake bias capacity 150 (F) may be 1, indicating that there is full capacity for braking to be biased towards the front friction brakes 110 relative to the rear friction brakes 112. For instance, the temperatures of the front friction brakes 110 may be below a threshold temperature, and/or may not be rising at more than a threshold rate. The cooling parameter 152 (G) may be 0.5, indicating that balanced cooling is achieved with a 50% torque split between the front friction brakes 110 and the rear friction brakes 112. The requested friction brake split determiner 148 may use these values in the above formula to determine that the requested friction brake split 138 (E) is 1, indicating that the front friction brakes 110 are to apply 100% of the braking torque that is allocated to friction brakes, while the rear friction brakes 112 are to apply 0% of the braking torque that is allocated to friction brakes.

As a second example, the target friction brake split 142 (A) may be 0.66, indicating that the front friction brakes 110 would ideally apply 66% of the braking torque allocated to friction brakes and that the rear friction brakes 112 would ideally apply 34% of the braking torque allocated to friction brakes. In this example, the axle friction brake bias capacity 150 (F) may be 1, indicating that there is full capacity for braking to be biased towards the front friction brakes 110 relative to the rear friction brakes 112. For instance, the temperatures of the front friction brakes 110 may be below a threshold temperature, and/or may not be rising at more than a threshold rate. The cooling parameter 152 (G) may be 0.5, indicating an unbiased friction torque split for balanced cooling between the front friction brakes 110 and the rear friction brakes 112. The requested friction brake split determiner 148 may use these values in the above formula to determine that the requested friction brake split 138 (E) is 0.66, indicating that the front friction brakes 110 are to apply 66% of the braking torque that is allocated to friction brakes, while the rear friction brakes 112 are to apply 34% of the braking torque that is allocated to friction brakes.

As a third example, the target friction brake split 142 (A) may be 0.66, indicating that the front friction brakes 110 would ideally apply 66% of the braking torque allocated to friction brakes and that the rear friction brakes 112 would ideally apply 34% of the braking torque allocated to friction brakes. In this example, the axle friction brake bias capacity 150 (F) may be 0.5, indicating that there is some capacity for braking to be biased towards the front friction brakes 110 relative to the rear friction brakes 112. For instance, the axle friction brake bias capacity 150 may be relatively low because the temperatures of the front friction brakes 110 are above a threshold temperature, and/or are rising at more than a threshold rate. The cooling parameter 152 (G) may be 0.5, indicating a thermal balance at a 50% torque split between the front friction brakes 110 and the rear friction brakes 112. The requested friction brake split determiner 148 may use these values in the above formula to determine that the requested friction brake split 138 (E) is 0.58, indicating that the front friction brakes 110 is to apply 58% of the braking torque that is allocated to friction brakes, while the rear friction brakes 112 is to apply 42% of the braking torque that is allocated to friction brakes.

As a fourth example, the target friction brake split 142 (A) may be 1, indicating that the front friction brakes 110 would ideally apply 100% of the braking torque allocated to friction brakes and that the rear friction brakes 112 would ideally apply 0% of the braking torque allocated to friction brakes. In this example, the axle friction brake bias capacity 150 (F) may be 0, indicating that there is no capacity for braking to be biased towards the front friction brakes 110 relative to the rear friction brakes 112. For instance, the axle friction brake bias capacity 150 may be 0 because the temperatures of the front friction brakes 110 are high and/or are rising quickly. The cooling parameter 152 (G) may be 0.5, indicating a 50% torque split for thermal balance between the front friction brakes 110 and the rear friction brakes 112. The requested friction brake split determiner 148 may use these values in the above formula to determine that the requested friction brake split 138 (E) is 0.5, indicating that the front friction brakes 110 is to apply 50% of the braking torque that is allocated to friction brakes, and that the rear friction brakes 112 is also to apply 50% of the braking torque that is allocated to friction brakes.

As demonstrated in the examples discussed above, in some situations the requested friction brake split 138 may be equal to the target friction brake split 142, for instance if the axle friction brake bias capacity 150 is 1 and thereby indicates a full capacity for bias towards the front friction brakes 110 relative to the rear friction brakes 112. However, in other situations the requested friction brake split 138 may be different from the target friction brake split 142. For instance, the requested friction brake split 138 may be different from the target friction brake split 142 if the axle friction brake bias capacity 150, determined via the axle friction brake bias capacity map 154, is less than 1 because the temperatures of the front friction brakes 110 are relatively high and/or are rising relatively quickly. Adjusting the target friction brake split 142 determined based on optimal conditions, based on the axle friction brake bias capacity 150 and/or the cooling parameter 152, may accordingly allow the requested friction brake split 138 to indicate how much torque should be applied via the front friction brakes 110 relative to the rear friction brakes 112 even if conditions are not optimal.

As an example, if the front friction brakes 110 on the front axle have been in continuous use for a relatively long period of time, for instance to control a speed of the machine 102 as the machine 102 travels a relatively long distance downhill into a mine pit, the temperature of the front friction brakes 110 on the front axle may become relatively hot and/or may rise relatively quickly. Accordingly, rather than using the target friction brake split 142 associated with optimal conditions, the requested friction brake split determiner 148 may determine the requested friction brake split 138 that should be used by adjusting the target friction brake split 142 based on the axle friction brake bias capacity 150 and the cooling parameter 152 in order to reduce, control, and/or otherwise manage the temperature of the front friction brakes 110. The requested friction brake split 138 determined by the requested friction brake split determiner 148 may, for example, indicate that the front friction brakes 110 should apply a lower amount of torque during a braking operation than the target friction brake split 142 would otherwise indicate.

The blended friction brake torque determiner 132 may accordingly use the requested friction brake split 138, instead of the target friction brake split 142, to determine actual amounts of torque to be applied by the front friction brakes 110 and the rear friction brakes 112 during a braking operation. As described above, when a brake command 122 is received that indicates a desired speed of the machine 102, the torque determiner 120 may determine an overall torque amount associated with a corresponding braking operation. The torque determiner 120 may also use the electric brake capacity 124, a wheel speed differential, and/or other factors to determine the electric brake ratio 126 indicating how much of the overall torque amount the electric brakes 114 can or should apply, and determine the friction brake ratio 128 based on a remainder of the overall torque amount not allocated to the electric brakes 114.

The blended friction brake torque determiner 132 may use the requested friction brake split 138 to allocate the friction brake ratio 128 between the front friction brake ratio 134 and the rear friction brake ratio 136. For example, if the requested friction brake split 138 indicates that under current conditions the front friction brakes 110 should apply 38% of the torque that is not allocated to the front friction brakes 110, the blended friction brake torque determiner 132 may determine that the front friction brake ratio 134 is 38% of the friction brake ratio 128, and that the rear friction brake ratio 136 is the remaining 62% of the friction brake ratio 128.

The electric brake ratio 126, the front friction brake ratio 134, and the rear friction brake ratio 136 may accordingly indicate respective portions of an overall amount of torque to be applied respectively by electric brakes 114, the front friction brakes 110, and the rear friction brakes 112 during a requested braking operation. The brake controller 104 may cause the electric brakes 114, the front friction brakes 110, and the rear friction brakes 112 to apply the portions of the overall amount of torque indicated by the electric brake ratio 126, the front friction brake ratio 134, and the rear friction brake ratio 136 during the braking operation. For instance, the brake controller 104 may cause the front friction brakes 110 to apply an amount of pressure, via brake pads or other mechanical components, that corresponds to a portion of the overall amount of torque determined based on the front friction brake ratio 134.

As a first example, if the electric brake ratio 126 is 0.9, indicating that the electric brakes 114 should apply 90% of an overall amount of torque associated with a requested braking operation, the friction brake ratio 128 may be 0.1 to indicate that some combination of the front friction brakes 110 and the rear friction brakes 112 should apply the remaining 10% of the overall amount of torque associated with the requested braking operation. The electric brake split 130 may be 0, indicating that only electric brakes 114 on the rear axle are to be used. The requested friction brake split 138 may be 1, indicating that the front friction brakes 110 should apply 100% of the braking torque allocated to friction brakes. In this example, the electric brake ratio 126 may be 0.9, the front friction brake ratio 134 may be 0.1, and the rear friction brake ratio 136 may be 0. Accordingly, during the braking operation, the electric brakes 114 apply 90% of the braking torque, the front friction brakes 110 apply 10% of the braking torque, and the rear friction brakes 112 are not used.

As a second example, if the electric brake ratio 126 is 0.5, indicating that the electric brakes 114 should apply 50% of an overall amount of torque associated with a requested braking operation, the friction brake ratio 128 may be 0.5 to indicate that some combination of the front friction brakes 110 and the rear friction brakes 112 should apply the remaining 50% of the overall amount of torque associated with the requested braking operation. The electric brake split 130 may be 0, indicating that only electric brakes 114 on the rear axle are to be used. The requested friction brake split 138 may be 0.66, indicating that the front friction brakes 110 should apply 66% of the braking torque allocated to friction brakes. In this example, the electric brake ratio 126 may be 0.5, the front friction brake ratio 134 may be 0.33 (66% of the braking torque allocated to friction brakes), and the rear friction brake ratio 136 may be 0.17 (34% of the braking torque allocated to friction brakes). Accordingly, during the braking operation the electric brakes 114 apply 50% of the braking torque, the front friction brakes 110 apply 33% of the braking torque, and the rear friction brakes 112 apply 17% of the braking torque.

As a third example, if the electric brake ratio 126 is 0.5, indicating that the electric brakes 114 should apply 50% of an overall amount of torque associated with a requested braking operation, the friction brake ratio 128 may be 0.5 to indicate that some combination of the front friction brakes 110 and the rear friction brakes 112 should apply the remaining 50% of the overall amount of torque associated with the requested braking operation. The electric brake split 130 may be 0.5, indicating that electric brakes 114 on the front axle and the rear axle are to be used equally. The requested friction brake split 138 may be 0.58, indicating that the front friction brakes 110 should apply 58% of the braking torque allocated to friction brakes. In this example, the electric brake ratio 126 may be 0.5, with the electric brakes 114 on the front axle and the rear axle each being allocated an equal portion of the electric brake ratio 126. The front friction brake ratio 134 may be 0.29 (58% of the braking torque allocated to friction brakes), and the rear friction brake ratio 136 may be 0.21 (42% of the braking torque allocated to friction brakes). Accordingly, during the braking operation electric brakes 114 on the front axle apply 25% of the braking torque, electric brakes 114 on the rear axle apply 25% of the braking torque, the front friction brakes 110 apply 29% of the braking torque, and the rear friction brakes 112 apply 21% of the braking torque.

Elements of the brake controller 104, such as the target friction brake split determiner 146 and/or the requested friction brake split determiner 148, may execute constantly, or once per second or on any other relatively frequent basis, to continually or periodically determine a most recent and up-to-date target machine axle split 140 and a most recent and up-to-date axle friction brake bias capacity 150 based on the most recently available sensor data 106. As an example, as conditions change during operation of the machine 102, corresponding values of parameters associated with the target machine axle split map 144 and the axle friction brake bias capacity map 154 may also change. For instance, grade and/or payload information used to determine the target machine axle split 140 via the target machine axle split map 144 may change over time, and temperature and temperature change information used to determine the axle friction brake bias capacity 150 via the axle friction brake bias capacity map 154 may also change over time. Accordingly, the brake controller 104 may continually or periodically use current values of such parameters indicated by the most recently available sensor data 106 to determine the current target machine axle split 140 and the current axle friction brake bias capacity 150, such that the those values may be used to determine the requested friction brake split 138 if and/or when a braking operation is requested via a brake command 122.

For example, when an operator of the machine 102 and/or an automated system of the machine 102 provides a brake command 122 associated with a desired braking operation to the brake controller 104, the torque determiner 120 may determine an overall torque amount to be applied during the braking operation. If the brake controller 104 determines that friction brakes should be used in combination with electric brakes 114, for instance due to a wheel speed differential or because the electric brake capacity 124 indicates that the electric brakes 114 do not currently have capacity to apply all of the torque amount associated with the braking operation, the brake controller 104 may determine the electric brake ratio 126 and the friction brake ratio 128 that indicate, respectively, how much of the overall torque amount is to be applied by the electric brakes 114 and friction brakes. The target friction brake split determiner 146 may use the electric brake ratio 126 and the most recent and up-to-date target machine axle split 140 to determine the current target friction brake split 142. The requested friction brake split determiner 148 may also use the most recent and up-to-date axle friction brake bias capacity 150, along with the cooling parameter 152 and the target friction brake split 142, to determine the requested friction brake split 138. The blended friction brake torque determiner 132 may accordingly use the requested friction brake split 138 to allocate the friction brake ratio 128 between the front friction brake ratio 134 and the rear friction brake ratio 136. Accordingly, in response to the brake command 122, the brake controller 104 may cause the electric brakes 114, the front friction brakes 110, and the rear friction brakes 112 to respectively apply amounts of braking torque that correspond to portions of the overall amount of torque that are respectively indicated by the electric brake ratio 126, the front friction brake ratio 134, and the rear friction brake ratio 136.

As discussed above, the target machine axle split map 144 and the axle friction brake bias capacity map 154 may be maps or lookup tables that the brake controller 104 may respectively use to determine a target machine axle split 140 and an axle friction brake bias capacity map 154 based on values of parameters indicted by sensor data 106. The target machine axle split 140 and the axle friction brake bias capacity 150 may be used as described herein to determine the requested friction brake split 138 that the blended friction brake torque determiner 132 may use if and/or when a braking operation is requested. FIG. 2 and FIG. 3, discussed further below, show examples of the target machine axle split map 144 and the axle friction brake bias capacity map 154.

FIG. 2 shows an example 200 of the target machine axle split map 144. As discussed above, the brake controller 104 may use the target machine axle split map 144 to determine the target machine axle split 140. Values of the target machine axle split 140 indicated by the target machine axle split map 144 may indicate percentages of an overall amount of torque to be applied during a braking operation that would ideally be applied via braking systems on the front axle, such as the front friction brakes 110 and/or electric brakes 114 on the front axle. A target machine axle split 140 may accordingly indicate that a remainder of the torque to be applied during the braking operation that is not applied by braking systems on the front axle may ideally be applied by via braking systems on the rear axle, such as the rear friction brakes 112 and/or electric brakes 114 on the rear axle. As described herein, although the target machine axle split 140 may indicate portions of torque that may ideally be applied by any or all braking systems on the front axle, the target friction brake split 142 and/or the requested friction brake split 138 may indicate other portions of torque to be applied by the front friction brakes 110 specifically.

As shown in FIG. 2, the target machine axle split map 144 may be a predetermined map or lookup table that indicates different values of the target machine axle split 140 that correspond to different combinations of grade values 202 and payload values 204. The brake controller 104 may use sensor data 106, provided by sensors 116 of the machine 102, to determine a current grade value 202 and a current payload value 204 associated with the machine 102. The brake controller 104 may accordingly use the target machine axle split map 144 to determine a particular value of the target machine axle split 140 that corresponds to the current grade value 202 and the current payload value 204.

As an example, an IMU or other orientation sensor may provide sensor data 106 indicating a current orientation of the machine 102, such as an indication of whether the machine 102 is angled upwards on an incline, angled downwards on a decline, or is on flat ground. Such sensor data 106 may accordingly indicate a slope angle, grade percentage, or other grade value 202 indicative of a grade of the ground surface 118 that the machine 102 is currently on, which may be used as the current grade value 202.

As shown in FIG. 2, the values of the target machine axle split 140 may generally increase as the grade values 202 decreases. For instance, the target machine axle split map 144 may indicate that brake systems on the front axle, such as the front friction brakes 110 and/or electric brakes 114 on the front axle, should ideally handle higher percentages of the torque associated with braking operations as the grade values 202 decrease. Accordingly, the target machine axle split map 144 may indicate that brake systems on the front axle, such as the front friction brakes 110 and/or electric brakes 114 on the front axle, should ideally apply more or less of the torque associated with braking operations based at least in part on the current grade of the ground surface 118 being traveled by the machine 102.

As another example, one or more sensors 116 associated with the bed 108 of the machine 102 may provide a weight measurement, a mass measurement, or other sensor data 106 indicating how much material is being carried in the bed 108. Such sensor data 106 may indicate a mass and/or weight of a payload being carried by the machine 102, and/or a percentage of that payload relative to a maximum payload that the bed 108 is designed to carry, which may be used as the current payload value 204.

As shown in FIG. 2, values of the target machine axle split 140 may generally decrease as the current payload value 204 increases. For instance, the target machine axle split map 144 may indicate that brake systems on the front axle, such as the front friction brakes 110 and/or electric brakes 114 on the front axle, should ideally handle lower percentages of the torque associated with braking operations as the payload value 204 increases. Similarly, the target machine axle split map 144 may indicate that brake systems on the rear axle, such as the rear friction brakes 112 and/or electric brakes 114 on the rear axle, should ideally handle higher percentages of the torque associated with braking operations as the payload value 204 increases, for instance because heavier payloads carried in the bed 108 of the machine 102 may shift the overall center of gravity of the machine 102 back towards the rear axle. Accordingly, the target machine axle split map 144 may indicate that brake systems on the front axle, such as the front friction brakes 110 and/or electric brakes 114 on the front axle, should ideally apply more or less of the torque associated with braking operations based at least in part on the amount and/or weight of a payload, if any, that is being transported by the machine 102.

Overall, the brake controller 104 may use sensor data 106 to determine the current grade value 202 and the current payload value 204 associated with the machine 102. The brake controller 104 may use the target machine axle split map 144 to look up or otherwise determine the particular value of the target machine axle split 140 that corresponds to the current grade value 202 and the current payload value 204. Although FIG. 2 shows a map or lookup table of predetermined values of the target machine axle split 140 that correspond to combinations of grade values 202 and payload value 204, in other examples the brake controller 104 may use other models, formulas, or techniques to dynamically determine a value of the target machine axle split 140 that corresponds to a grade value 202 and a payload value 204. As described herein, the brake controller 104 may determine the requested friction brake split 138 based on the target friction brake split 142 generated based at least in part on the target machine axle split 140 determined via the target machine axle split map 144, as well as based on the axle friction brake bias capacity 150. Determination of the axle friction brake bias capacity 150 is discussed further below with respect to FIG. 3.

FIG. 3 shows an example 300 of the axle friction brake bias capacity map 154. As discussed above, the brake controller 104 may use the axle friction brake bias capacity map 154 to determine the axle friction brake bias capacity 150. Values of the axle friction brake bias capacity 150 indicated by the axle friction brake bias capacity map 154 may indicate how much capacity exists for bias towards the friction brakes on a particular axle relative to the friction brakes on another axle. Higher values of the axle friction brake bias capacity 150 may indicate more capacity for bias towards the friction brakes on the particular axle relative to the friction brakes on the other axle, while lower values of the axle friction brake bias capacity 150 may indicate less capacity for bias towards the friction brakes on the particular axle relative to friction brakes on the other axle.

For example, if the axle friction brake bias capacity 150 is a front friction brake bias capacity indicating a capacity for usage of the front friction brakes 110 relative to the rear friction brakes 112, an axle friction brake bias capacity 150 of 1 may indicate that there is full capacity for bias towards the front friction brakes 110 relative to the rear friction brakes 112. Accordingly, an axle friction brake bias capacity 150 of 1 may indicate that the front friction brakes 110 could potentially be used without simultaneous use of the rear friction brakes 112. However, in this example an axle friction brake bias capacity 150 of 0 may indicate that there is no capacity for bias towards the front friction brakes 110 relative to the rear friction brakes 112, such that the front friction brakes 110 and the rear friction brakes 112 should be used simultaneously and equally.

As shown in FIG. 3, the axle friction brake bias capacity map 154 may be a predetermined map or lookup table that indicates different values of the axle friction brake bias capacity 150 that correspond to different combinations of temperature values 302 and temperature increase rates 304 associated with the friction brakes on the particular axle. The brake controller 104 may use sensor data 106, provided by sensors 116 of the machine 102, to determine a current temperature value 302 and a current temperature increase rate 304 associated with the friction brakes on the particular axle. The brake controller 104 may accordingly use the axle friction brake bias capacity map 154 to determine a value of the axle friction brake bias capacity 150 that corresponds to the current temperature value 302 and the current temperature increase rate 304.

As an example, if the axle friction brake bias capacity 150 is a front friction brake bias capacity, a thermometer, a virtual temperature sensor, or other type of temperature sensor may provide sensor data 106 indicating a current temperature of the front friction brakes 110, and indicating a current rate at which the temperature of the front friction brakes 110 is changing. Such sensor data 106 may accordingly indicate the current temperature value 302 and the current temperature increase rate 304, and may be used by the brake controller 104 to determine the corresponding value of the axle friction brake bias capacity 150 based on the axle friction brake bias capacity map 154.

As shown in FIG. 3, the axle friction brake bias capacity 150 may generally decrease as the temperature values 302 increase or exceed threshold temperatures, and/or as the temperature increase rates 304 increase or exceed threshold rates. For instance, the axle friction brake bias capacity map 154 may indicate an axle friction brake bias capacity 150 of 1 in association with relatively low current temperature values 302 and relatively low current temperature increase rates 304, such that the axle friction brake bias capacity map 154 indicates that there is full capacity for bias towards use of the friction brakes on the particular axle relative to friction brakes on another axle when the friction brakes on the particular axle are relatively cool and/or are increasing in temperature at relatively low rates. However, the values of the axle friction brake bias capacity 150 indicated by the axle friction brake bias capacity map 154 may decrease as the current temperature value 302 and/or the current temperature increase rate 304 increase, thereby indicating that there may be less capacity, or no capacity, for bias towards use of the friction brakes on the particular axle relative to friction brakes on the other axle when the friction brakes on the particular axle are relatively hot and/or are increasing in temperature at relatively high rates.

Overall, the brake controller 104 may use sensor data 106 to determine the current temperature value 302 and the current temperature increase rate 304 associated with the friction brakes on a particular axle. The brake controller 104 may use the axle friction brake bias capacity map 154 to look up or otherwise determine a value of the axle friction brake bias capacity 150 that corresponds to the current temperature value 302 and the current temperature increase rate 304, such that the axle friction brake bias capacity 150 indicates a capacity for usage of the friction brakes on the particular axle relative to usage of friction brakes on the other axle. Although FIG. 3 shows a map or lookup table of predetermined values of the axle friction brake bias capacity 150 that correspond to combinations of temperature values 302 and temperature increase rates 304, in other examples the brake controller 104 may use other models, formulas, or techniques to dynamically determine a value of the axle friction brake bias capacity 150 that corresponds to a temperature value 302 and a current temperature increase rate 304. As described herein, the brake controller 104 may determine the requested friction brake split 138 based on the axle friction brake bias capacity 150 that is determined via the axle friction brake bias capacity map 154, as well as based on the target friction brake split 142. Use of the requested friction brake split 138 during a braking operation is discussed further below with respect to FIG. 4 and FIG. 5.

Figure 4:
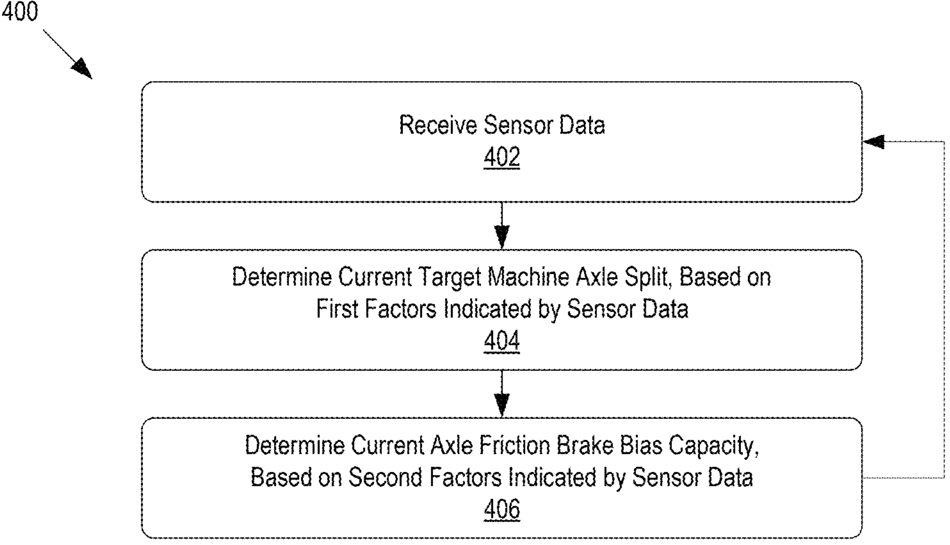
FIG. 4 is a flowchart illustrating an example process for determining axle split information based on sensor data that indicates a current operating state of the machine.

FIG. 4 is a flowchart 400 illustrating an example process for determining axle split information based on sensor data 106 that indicates a current operating state of the machine 102. The operations shown in FIG. 4 may be performed by a computing system on-board the machine 102, such as a computing system that executes the brake controller 104. FIG. 6, discussed further below, describes an example system architecture for such a computing system.

At block 402, the computing system may receive sensor data 106 from one or more sensors 116 of the machine 102. The sensors 116 may include physical sensors that take measurements and/or capture other data, virtual sensors that generate estimates of states of components based on sensor data 106 provided by other sensors 116, maps, models, and/or other systems, and/or other types of sensors 116. For example, the sensor data 106 may include measurements and/or estimates indicating a weight and/or mass of a payload being carried by the machine 102, grade information associated with the ground surface 118 being traveled by the machine 102, and/or temperatures and temperature change rates associated with the front friction brakes 110.

At block 404, the computing system may determine the current target machine axle split 140 based on first factors indicated by the sensor data 106 received at block 402. The first factors may include a current grade value 202 associated with the ground surface 118 being traveled by the machine 102, and a current payload value 204 associated with a weight and/or mass of a payload being carried by the machine 102. In some examples, the computing system may use the target machine axle split map 144 to look up a value of the target machine axle split 140 that corresponds to the current grade value 202 and the current payload value 204. In other examples, the computing system may use a model, formula, or other technique to determine the target machine axle split 140 based on the current grade value 202 and the current payload value 204. For example, the computing system may determine or modify the target machine axle split 140 based on a wheel speed differential that indicates actual or potential traction and/or control issues, for instance to indicate a target split between overall usage of braking systems on the front axle relative to braking systems on the rear axle that may improve machine traction and/or control. The current target machine axle split 140 determined at block 404 may indicate a target split between usage of all braking systems on the front axle of the machine 102 relative to all braking systems on the rear axle of the machine 102, based on a current operating state of the machine 102 indicated by the current grade value 202 and the current payload value 204.

At block 406, the computing system may determine the current axle friction brake bias capacity 150 based on second factors indicated by the sensor data 106 received at block 402. The second factors may include a current temperature value 302 associated with friction brakes on a particular axle, and a current temperature increase rate 304 associated with the friction brakes on that particular axle. For example, if the axle friction brake bias capacity 150 is a front friction brake bias capacity indicating a capacity for usage of the front friction brakes 110 relative to the rear friction brakes 112, the second factors may include a current temperature value 302 associated with the front friction brakes 110 and a current temperature increase rate 304 associated with the front friction brakes 110.

In some examples, the computing system may use the axle friction brake bias capacity map 154 to look up a value of the axle friction brake bias capacity 150 that corresponds to the current temperature value 302 and the current temperature increase rate 304 associated with the friction brakes on the particular axle. In other examples, the computing system may use a model, formula, or other technique to determine the axle friction brake bias capacity 150 based on the current temperature value 302 and the current temperature increase rate 304 associated with the friction brakes on the particular axle.

In some examples, the computing system may determine or modify the axle friction brake bias capacity 150 based on a wheel speed differential that indicates actual or potential traction and/or control issues. As an example, if the axle friction brake bias capacity 150 is a front friction brake capacity, the computing system may modify the axle friction brake bias capacity 150 to indicate a preference for higher usage of the front friction brakes 110 relative to usage of the rear friction brakes 112, in combination with electric brakes 114 on the rear axle, in order to improve machine traction and/or control.

Overall, the current axle friction brake bias capacity 150 may indicate a current capacity for bias towards usage of friction brakes 110 on one particular axle relative to usage of friction brakes on a different axle, based on a current operating state of the machine 102. The current operating state of the machine 102 may be indicated by the current temperature value 302 and the current temperature increase rate 304 associated with the friction brakes on the particular axle, a wheel speed differential, and/or other factors.

The computing system may repeat the operations shown in FIG. 4 as new or different sensor data 106 is received, for instance to continually or periodically determine most recent and up-to-date values of the target machine axle split 140 and the axle friction brake bias capacity 150 based on the most recently-received sensor data 106. As an example, if new sensor data 106 received at block 402 indicates that the current grade value 202 and/or the current payload value 204 has changed since the last time the target machine axle split 140 was determined, the computing system may use the new current grade value 202 and/or the new current payload value 204 to determine a new current target machine axle split 140 at block 404. Similarly, if new sensor data 106 received at block 402 indicates that the current temperature value 302 and/or the current temperature increase rate 304 associated with the friction brakes on a particular axle has changed since the last time the corresponding axle friction brake bias capacity 150 was determined, the computing system may use the new current temperature value 302 and/or the new current temperature increase rate 304 to determine a new axle friction brake bias capacity 150 at block 406.

Accordingly, the computing system may continually or periodically use the operations shown in FIG. 4 to determine and/or update the current target machine axle split 140 and the current axle friction brake bias capacity 150. The computing system may continually or periodically determine and/or update the current target machine axle split 140 and the current axle friction brake bias capacity 150 such that if and/or when a braking operation is requested, the current target machine axle split 140 and the current axle friction brake bias capacity 150 is available to be used to determine the requested friction brake split 138 as discussed further below with respect to FIG. 5.

Figure 5:
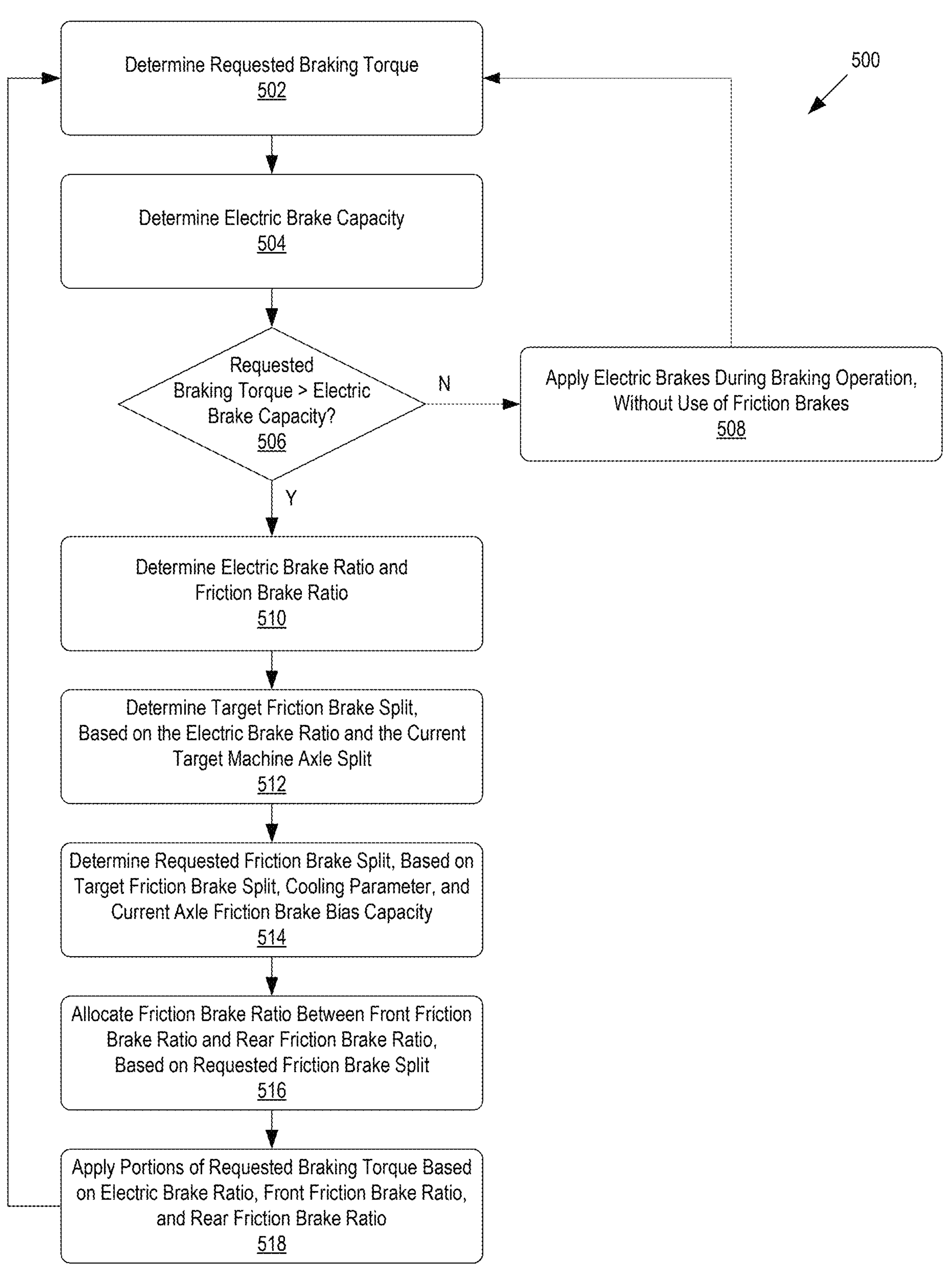
FIG. 5 is a flowchart illustrating an example process for determining a blended axle split that indicates portions of braking torque to be applied by braking systems on a front axle and a rear axle of the machine.

FIG. 5 is a flowchart 500 illustrating an example process for determining a blended axle split that indicates portions of braking torque to be applied by braking systems on a front axle and a rear axle of the machine 102. The operations shown in FIG. 5 may be performed by a computing system on-board the machine 102, such as a computing system that executes the brake controller 104. FIG. 6, discussed further below, describes an example system architecture for such a computing system.

At block 502, the computing system may determine a requested braking torque associated with a braking operation that is to be performed by the machine 102. For example, when a brake command 122 is received that indicates a target speed of the machine 102, the computing system may use a difference between the target speed and a current speed of the machine 102, a weight and/or mass of the machine 102, a combined weight and/or mass of the machine 102 and a payload being carried by the machine 102 indicated by sensor data 106, a grade of the ground surface 118 being traveled by the machine 102 indicated by sensor data 106, and/or other factors to determine how much braking torque would cause the machine 102 to travel at the target speed indicated by the brake command 122.

At block 504, the computing system may determine the current electric brake capacity 124 of the electric brakes 114 of the machine 102. The computing system may determine the electric brake capacity 124 based on sensor data 106 received from sensors 116 associated with the electric brakes 114, a battery of the machine 102, and/or other sensors 116. The electric brake capacity 124 may be determined based on a current capacity of the electric brakes 114 to apply torque, a current capacity of a battery and/or other electrical systems of the machine 102 to store or otherwise use energy captured via the electric brakes 114 when the electric brakes 114 apply torque, and/or based on other factors.

At block 506, the computing system may determine whether the requested braking torque exceeds the current electric brake capacity 124. For example, the computing system may use the current electric brake capacity 124 to determine whether the electric brakes 114 of the machine 102 currently have the capacity to apply all of the requested braking torque. If the requested braking torque does not exceed the current electric brake capacity 124 (Block 506—No), such that the electric brakes 114 currently have the capacity to apply all of the requested braking torque, at block 508 the computing system may cause the electric brakes 114 to apply the requested braking torque during the braking operation, without use of the front friction brakes 110 or the rear friction brakes 112 during the braking operation. The computing system may return to block 502 to determine braking torque associated with a subsequent braking operation or an adjusted amount of braking torque associated with the current braking operation.

However, if the requested braking torque does exceed the current electric brake capacity 124 (Block 506—Yes), such that the electric brakes 114 do not currently have the capacity to apply all of the requested braking torque, the computing system may determine to use friction brakes, such as the front friction brakes 110 and/or the rear friction brakes 112, instead of or in addition to the electric brakes 114 during the braking operation. Alternatively, if the requested braking torque does not exceed the current electric brake capacity 124 such that electric brakes 114 on the rear axle of the machine 102 could apply the full amount of requested braking torque (Block 506—No), but a wheel speed differential indicates that braking systems on the front axle should be used in combination with the rear electric brakes 114 in order to improve traction and/or controllability of the machine 102 overall, the computing system may determine to use friction brakes, including the front friction brakes 110, in addition to the electric brakes 114 during the braking operation.

Accordingly, at block 510, the computing system may determine the electric brake ratio 126 and the friction brake ratio 128, based on the electric brake capacity 124, a wheel speed differential, and/or other factors. The computing system may determine the electric brake ratio 126 to be a first portion of the requested braking torque that should be applied by the electric brakes 114, for instance based on the current electric brake capacity 124, a wheel speed differential, and/or other factors. The computing system may determine the friction brake ratio 128 to be a remaining portion of the requested braking torque that is not allocated to the electric brakes 114 via the electric brake ratio 126. As a non-limiting example, if the electric brake capacity 124 indicates that the electric brakes 114 currently have the capacity to apply 60% of the requested braking torque, the computing system may indicate that the electric brake ratio 126 is 60% of the requested braking torque, and that the friction brake ratio 128 is the remaining 40% of the requested braking torque.

The electric brake ratio 126 determined at block 510 may indicate a value for the electric brake split 130. In some examples, the machine 102 may have one set of electric brakes 114, such as electric brakes 114 on the rear axle of the machine 102. Accordingly, in these examples the electric brake split 130 may be set to a value indicating that the only set of electric brakes 114 is to apply all of the portion of the braking torque identified by the electric brake ratio 126. In other examples, the machine 102 may have electric brakes 114 on both axles, such as front electric brakes 114 on the front axle and rear electric brakes 114 on the rear axle. In these examples, the electric brake split 130 may be set to a value that indicates how the electric brake ratio 126 is allocated between the electric brakes 114 associated with the different axles, such as a value indicating that front electric brakes 114 and rear electric brakes 114 are to be allocated equal portions of the electric brake ratio 126.

The friction brake ratio 128 determined at block 510 may indicate a portion of the requested braking torque that is allocated to friction brakes and not to electric brakes 114. However, because the machine 102 may have friction brakes associated with different axles, such as the front friction brakes 110 and the rear friction brakes 112, the friction brake ratio 128 determined at block 510 may be allocated between the front friction brake ratio 134 and the rear friction brake ratio 136 as described further below.

At block 512, the computing system may determine the target friction brake split 142. The target friction brake split 142 may indicate a target split between usage of the front friction brakes 110 relative to the rear friction brakes 112 under optimal or ideal conditions. The computing system may determine the target friction brake split 142 based on the electric brake ratio 126 determined at block 510 and based on the current target machine axle split 140. The current target machine axle split 140 may be a value that the computing system has already determined, or determines separately, based on sensor data 106 indicating a current grade value 202, a current payload value 204, and/or other factors, for example as discussed above with respect to block 404 of FIG. 4.

The current target machine axle split 140 may indicate a target split between usage of all braking systems on the front axle of the machine 102 relative to all braking systems on the rear axle of the machine 102. The target machine axle split 140 may accordingly apply to all braking systems, including friction brakes and electric brakes 114. Accordingly, at block 512, the computing system may determine the target friction brake split 142 that is specifically associated with friction brakes, instead of both friction brakes and electric brakes 114. The computing system may modify the target machine axle split 140, based on the electric brake ratio 126 and/or the electric brake split 130 indicating how much of the requested braking torque is allocated to electric brakes 114, to in order to determine the target friction brake split 142 indicating target usage of the front friction brakes 110 relative to the rear friction brakes 112. For example, at block 512, the computing system may determine the target friction brake split 142 using the following formula: $A=\max(0, \min(1, (B-(C*D))/(1-D)))$, where A is the target friction brake split 142, B is the target machine axle split 140, C is the electric brake split 130, and D is the electric brake ratio 126.

At block 514, the computing system may determine the requested friction brake split 138. The requested friction brake split 138 may indicate an actual split to be used between usage of the front friction brakes 110 relative to the rear friction brakes 112 under current conditions. The requested friction brake split 138 may be the same as the target friction brake split 142, or may differ from the target friction brake split 142. For example, although the target friction brake split 142 may be a value that should be used under optimal or ideal conditions, the requested friction brake split 138 may differ from the target friction brake split 142 if those optimal or ideal conditions do not exist.

The computing system may determine the requested friction brake split 138 at block 514 based on the target friction brake split 142 determined at block 512, based on the cooling parameter 152, and based on the current axle friction brake bias capacity 150 that indicates a current capacity for bias towards usage of friction brakes on one particular axle relative to usage of the friction brakes on another axle. The current axle friction brake bias capacity 150 may be a value that the computing system has already determined, or determines separately, based on sensor data 106 indicating a current temperature value 302 and a current temperature increase rate 304 associated with the friction brakes on the particular axle, for example as discussed above with respect to block 406 of FIG. 4.

As noted above, the requested friction brake split 138 determined at block 514 may be the same as the target friction brake split 142 determined at block 512, or may differ from the target friction brake split 142 determined at block 512. For instance, if the current axle friction brake bias capacity 150 indicates that there is currently full capacity for bias towards friction brakes on one axle relative to friction brakes on another axle, in some situations the requested friction brake split 138 may be the same as the target friction brake split 142. However, if the current axle friction brake bias capacity 150 indicates that there is less than full capacity for bias towards friction brakes on one axle relative to friction brakes on a different axle, in some situations the requested friction brake split 138 may differ from the target friction brake split 142. The computing system may determine the requested friction brake split 138 at block 514 using the following formula: E=(A*F)+((1−F)*G), where E is the requested friction brake split 138, A is the target friction brake split 142, F is the axle friction brake bias capacity 150, and G is the cooling parameter 152.

At block 516, the computing system may allocate the friction brake ratio 128 determined at block 510 between the front friction brake ratio 134 and the rear friction brake ratio 136, based on the requested friction brake split 138 determined at block 514. As a non-limiting example, the friction brake ratio 128 determined at block 510 may indicate that friction brakes of the machine 102 should apply 40% of the requested braking torque, and the requested friction brake split 138 determined at block 514 may indicate that the front friction brakes 110 should be allocated 75% of the braking torque allocated to the friction brakes. Accordingly, in this example, the computing system may allocate portions of the friction brake ratio 128, based on the requested friction brake split 138, such that the front friction brake ratio 134 is 30% of the overall requested braking torque (75% of the 40% of the requested braking torque allocated to the friction brakes), and that the rear friction brake ratio 136 is 10% of the overall requested braking torque (the remaining 25% of the 40% of the requested braking torque allocated to the friction brakes). In this example, the electric brake ratio 126 may be the other 60% of the overall requested braking torque that is not allocated to either the front friction brakes 110 or the rear friction brakes 112.

At block 518, the computing system may cause the braking systems of the machine 102 to apply respective portions of the requested braking torque, based on the electric brake ratio 126 determined at block 510 and the front friction brake ratio 134 and the rear friction brake ratio 136 determined at block 516. As a non-limiting example, if the electric brake ratio 126 is 60% of the requested braking torque associated with the braking operation, the computing system may output signals that cause the electric brakes 114 to apply 60% of the requested braking torque. If the electric brake split 130 indicates that different electric brakes 114 on different axles are to apply different portions of that 60% of the requested braking torque, the computing system may accordingly cause the different electric brakes 114 to apply those different portions of the 60% of the requested braking torque. In this example, the friction brake ratio 128 is the remaining 40% of the requested braking torque associated with the braking operation. Accordingly, the computing system may output signals that cause the rear friction brakes 112 and the electric brakes 114 to apply respective portions, indicated by the front friction brake ratio 134 and the rear friction brake ratio 136, of the 40% of the requested braking torque that is allocated to the friction brakes, for instance by applying corresponding amounts of pressure via brake pads or other mechanical components.

The computing system may also return to block 502 to determine braking torque associated with a subsequent braking operation or an adjusted amount of braking torque associated with the current braking operation. For example, if a new braking operation is requested via a brake command 122 that indicates a different target speed, and/or there have been changes to the electric brake capacity 124, the current grade value 202, the current payload value 204, the current temperature value 302, the current temperature increase rate 304, a wheel speed differential, and/or other factors, the computing system may determine different values of the electric brake ratio 126, the friction brake ratio 128, the target machine axle split 140, the target friction brake split 142, the axle friction brake bias capacity 150, and/or the requested friction brake split 138 in association with the new braking operation. The brake controller 104 may accordingly dynamically determine blended axle split values, such as the electric brake ratio 126, the front friction brake ratio 134, and the rear friction brake ratio 136, indicating respective portions of braking torque to be applied by various braking systems of the machine 102, based on sensor data 106 and/or other information indicating a current operating state of the machine 102 when a braking operation is requested.

FIG. 6 shows an example system architecture for a computing system 600 that executes one or more elements described in the present disclosure. The computing system 600 may include one or more computing devices, controllers, or other computing elements that include one or more processors 602, memory 604, and/or communication interfaces 606.

The computing system 600 may be, or may include, an ECM or other on-board computing system of the machine 102 that executes the brake controller 104 described herein. In some examples, elements of the brake controller 104 may be distributed among multiple computing systems similar to the computing system 600 shown in FIG. 6. For instance, the torque determiner 120 may be implemented by a first computing system, while the blended friction brake torque determiner 132 may be implemented by a second computing system.

The processor(s) 602 of the computing system 600 may operate to perform a variety of functions as set forth herein. The processor(s) 602 may include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 602 may have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 602 may also access content and computer-executable instructions stored in the memory 604, and execute such computer-executable instructions.

The memory 604 may be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media may be non-transitory computer-readable media. The computer-readable media may be configured to store computer-executable instructions that may be executed by the processor(s) 602 to perform the operations described herein.

For example, the memory 604 may include a drive unit and/or other elements that include machine-readable media. A machine-readable medium may store one or more sets of instructions, such as software or firmware, that embodies any one or more of the methodologies or functions described herein. The instructions may also reside, completely or at least partially, within the processor(s) 602 and/or communication interface(s) 606 during execution thereof by the computing system 600. For example, the processor(s) 602 may possess local memory, which also may store program modules, program data, and/or one or more operating systems.

The memory 604 may store data and/or computer-executable instructions associated with elements of the brake controller 104 described herein. For example, the memory 604 may store data and/or computer-executable instructions associated with the torque determiner 120, the blended friction brake torque determiner 132, the target machine axle split map 144, the target friction brake split determiner 146, the requested friction brake split determiner 148, the axle friction brake bias capacity map 154, and/or other elements.

The memory 604 may also store other modules and data 608 that may be utilized by the computing system 600 to perform or enable performing any action taken by the computing system 600. For example, the other modules and data 608 may include a platform, operating system, and/or applications, as well as data utilized by the platform, operating system, and/or applications.

The communication interfaces 606 may include transceivers, modems, interfaces, antennas, and/or other components that may transmit and/or receive data over networks or other data connections. The communication interfaces 606 may include data interfaces associated with sensors 116, operator controls, braking systems, other computing systems, and/or other elements of the machine 102. For example, the communication interfaces 606 may allow the brake controller 104 to receive sensor data 106 from sensors 116, receive brake commands 122, receive information indicative of the electric brake capacity 124, and/or output data that causes one or more braking systems to apply torque based on the electric brake ratio 126, the electric brake split 130, the front friction brake ratio 134, and/or the rear friction brake ratio 136 determined by the brake controller 104. In some examples, the communication interfaces 606 may also include wireless communication interfaces that allow the computing system 600 may communicate with one or more off-board computing systems, for instance to report location data to off-board computing systems, receive autonomous machine commands, and/or otherwise exchange data with off-board computing systems.

INDUSTRIAL APPLICABILITY

As described herein, the brake controller 104 may dynamically determine a blended axle split associated with a braking operation that is to be performed by the machine 102. The blended axle split indicates portions of braking torque to be applied by braking systems associated with a front axle and a rear axle of the machine 102. For example, the brake controller 104 may determine an electric brake ratio 126 indicating a first portion of the braking torque to be applied by electric brakes 114 on at least one of a front axle or a rear axle of the machine 102, a front friction brake ratio 134 indicating a second portion of the braking torque to be applied by front friction brakes 110 on the front axle, and a rear friction brake ratio 136 indicating a third portion of the braking torque to be applied by rear friction brakes 112 on the rear axle.

The brake controller 104 may dynamically determine the electric brake ratio 126, the front friction brake ratio 134, and the rear friction brake ratio 136 based on values of factors that may change over time based on the operating state of the machine 102. For example, when the machine is to perform a braking operation, the brake controller 104 may determine the electric brake ratio 126, the front friction brake ratio 134, and the rear friction brake ratio 136 based on current values of the electric brake capacity 124, a wheel speed differential, the current grade value 202, the current payload value 204, and the current temperature value 302 and current temperature increase rate 304 associated with the front friction brakes 110.

Accordingly, as the values of such factors change during operation of the machine 102, the brake controller 104 may dynamically determine new or updated values of the electric brake ratio 126, the front friction brake ratio 134, and/or the rear friction brake ratio 136 based on the current operating state of the machine 102. As an example, when the machine 102 begins traveling downhill after traveling on a flat ground surface 118, the current grade value 202 may change. Accordingly, the target machine axle split 140 determined based in part on the current grade value 202 may change, and the changed target machine axle split 140 may lead to a different target friction brake split 142 and a different requested friction brake split 138 that is used to determine the front friction brake ratio 134 and the rear friction brake ratio 136.

As another example, the axle friction brake bias capacity 150, used to determine the requested friction brake split 138 based on the target friction brake split 142, may change as the temperatures of friction brakes on a particular axle change over time. For instance, as the temperatures of the front friction brakes 110 increase, the current temperature value 302 and the current temperature increase rate 304 associated with the front friction brakes 110 may change such that the axle friction brake bias capacity 150 associated with the front friction brakes 110 decreases. When the axle friction brake bias capacity 150 decreases due to such temperature factors associated with the front friction brakes 110, the requested friction brake split 138 that is used to determine the front friction brake ratio 134 and the rear friction brake ratio 136 may differ from the target friction brake split 142 that may otherwise be used during other conditions in which the temperatures of the front friction brakes 110 are not high and/or are not rising quickly.

Temperature factors associated with the friction brakes on one axle may be likely to impact the corresponding axle friction brake bias capacity 150 during operations of the machine 102 that involve relatively heavy use of the friction brakes on that axle. For example, the machine 102 may be a haul truck that operates at a mine site. The haul truck may travel downhill for an extended period of time as the haul truck travels on a haul road down into a deep mining pit at the mine site. The haul truck may constantly or frequently perform braking operations as the haul truck travels downhill for the extended period of time, in order to control or maintain the speed of the haul truck during extended downhill travel.

Such braking operations associated with extended downhill travel may involve significant and/or extended usage of the front friction brakes 110. For example, although the electric brakes 114 may be the primary braking system for the machine 102, continuous or frequent braking operations during extended downhill travel of the machine 102 may cause the electric brakes 114 to generate or capture more energy than may be stored in a battery of the machine 102, such that the electric brake capacity 124 may become relatively low and friction brakes may be used to supplement that electric brakes 114. As another example, if the machine 102 only has electric brakes 114 on the rear axle, the machine 102 may use the front friction brakes 110 in combination with the rear electric brakes relatively frequently during downhill travel and/or in other situations, for instance because usage of braking systems on both axles may provide improved traction and/or or overall machine controllability.

While the front friction brakes 110 are relatively cool, the corresponding axle friction brake bias capacity 150 associated with the front friction brakes 110 may be high such that the front friction brakes 110 may apply more braking torque than the rear friction brakes 112. However, heavy usage of the front friction brakes 110, instead of or in addition to the electric brakes 114, for a significant period of time during continuous downhill travel and/or other situations may cause the front friction brakes 110 to become relatively hot and/or to increase in temperature relatively quickly. Accordingly, the temperatures of the front friction brakes 110 of the haul truck during extended downhill travel and/or other situations may be more likely to be high, and/or to increase at a high rate, than temperatures of braking systems of other machines that primarily travel on flat ground and normally use friction braking systems to supplement electric brakes less often and/or for fewer extended periods of time than haul trucks at a mine site.

By adjusting the target friction brake split 142 based on the axle friction brake bias capacity 150 that may decrease due to temperature considerations associated with the front friction brakes 110, the brake controller 104 may manage usage of the front friction brakes 110 relative to usage of the rear friction brakes 112 and/or the electric brakes 114 to control the temperatures of the front friction brakes 110. For example, the brake controller 104 may cause the front friction brakes 110 to be used in combination with electric brakes 114, such as rear electric brakes electric brakes 114, to improve machine traction and controllability, and/or during situations in which the electric brake capacity 124 is relatively low. However, as the front friction brakes 110 get hotter during extended downhill travel or other situations in which the front friction brakes 110 may be used relatively heavily instead of or in addition to electric brakes 114, the axle friction brake bias capacity 150 may decrease. The brake controller 104 may respond by using the corresponding requested friction brake split 138 to decrease the front friction brake ratio 134 and increase the rear friction brake ratio 136. Accordingly, in such situations in which the front friction brakes 110 are getting hotter, the brake controller 104 may cause the front friction brakes 110 to be used less heavily than if the brake controller 104 had determined the front friction brake ratio 134 and the rear friction brake ratio 136 based on the target friction brake split 142 that may be associated with optimal or ideal conditions in which the front friction brakes 110 are cooler.

By decreasing the front friction brake ratio 134 and increasing the rear friction brake ratio 136 in such situations in which the front friction brakes 110 become relatively hot and/or increase in temperature relatively quickly, the combined braking systems of the machine 102 may continue to apply full amounts of requested braking torque during braking operations. However, the decreased usage of the front friction brakes 110 and increased usage of the rear friction brakes 112 may help manage or control the temperatures of the front friction brakes 110 during such situations, while still allowing the front friction brakes 110 to be used during situations in which the electric brake capacity 124 is relatively low and/or usage of braking systems on the front axle may assist with overall traction or controllability of the machine 102. Accordingly, risks of the front friction brakes 110 overheating may be reduced, the lifespan of the front friction brakes 110 may be extended, maintenance of the front friction brakes 110 may be performed less often, cooling systems associated with the front friction brakes 110 may be used less extensively and/or more efficiently, and/or systems associated with the front friction brakes 110 may be more reliable overall.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A method, performed by a brake controller of a machine, comprising:
- determining braking torque associated with a braking operation to be performed by one or more braking systems of a set of braking systems of the machine, the set of braking systems comprising:
  - electric brakes,
  - front friction brakes associated with a front axle of the machine, and
  - rear friction brakes associated with a rear axle of the machine;
- allocating the braking torque between an electric brake ratio and a friction brake ratio;
- determining a target machine axle split, based on first sensor data indicating:
  - a grade value indicating a grade of a ground surface being traveled by the machine, and
  - a payload value indicating a weight or mass of a payload carried by the machine;
- determining a target friction brake split based on the electric brake ratio and the target machine axle split;
- determining an axle friction brake bias capacity, based on second sensor data indicating a temperature and a temperature increase rate associated with one of the front friction brakes or the rear friction brakes;
- determining a requested friction brake split based on the target friction brake split and the axle friction brake bias capacity;
- allocating, based on the requested friction brake split, the friction brake ratio between a front friction brake ratio and a rear friction brake ratio; and
- causing the one or more braking systems to apply respective portions of the braking torque indicated by the electric brake ratio, the front friction brake ratio, and the rear friction brake ratio.

2. The method of claim 1, wherein the target machine axle split is determined based on a target machine axle split map that indicates predetermined values of the target machine axle split that correspond to combinations of different grade values and different payload values.

3. The method of claim 1, wherein the axle friction brake bias capacity is determined based on an axle friction brake bias capacity map that indicates predetermined values of the axle friction brake bias capacity that correspond to combinations of different values of the temperature and the temperature increase rate.

4. The method of claim 1, wherein the axle friction brake bias capacity indicates a capacity for bias towards usage of the front friction brakes relative to the rear friction brakes.

5. The method of claim 1, wherein:
- the electric brakes comprise:
  - front electric brakes associated with the front axle; and
  - rear electric brakes associated with the rear axle, the target friction brake split is further determined based on an electric brake split indicating respective usage levels of the front electric brakes and the rear electric brakes, and a respective portion of the braking torque, indicated by the electric brake ratio, comprises a first portion of the braking torque allocated to the front electric brakes and a second portion of the braking torque allocated to the rear electric brakes based on the electric brake split.

6. The method of claim 1, wherein:

the requested friction brake split is further determined based on a value of a cooling parameter, and the value of the cooling parameter indicates a torque split, between the front friction brakes and the rear friction brakes, that equalizes cooling between cooling systems associated with the front friction brakes and the rear friction brakes.

7. The method of claim 1, wherein the electric brakes are associated with the rear axle.

8. A brake controller of a machine, comprising:

one or more processors; and memory storing computer-executable instructions that, when executed by the one or more processors, cause the one or more processors to perform operations comprising:

determining braking torque associated with a braking operation to be performed by one or more braking systems of a set of braking systems of the machine, the set of braking systems comprising:

electric brakes, front friction brakes associated with a front axle of the machine, and rear friction brakes associated with a rear axle of the machine;

allocating the braking torque between an electric brake ratio and a friction brake ratio;

determining a target machine axle split, based on first sensor data indicating:

a grade value indicating a grade of a ground surface being traveled by the machine, and a payload value indicating a weight or mass of a payload carried by the machine;

determining a target friction brake split based on the electric brake ratio and the target machine axle split;

determining an axle friction brake bias capacity, based on second sensor data indicating a temperature and a temperature increase rate associated with one of the front friction brakes or the rear friction brakes;

determining a requested friction brake split based on the target friction brake split and the axle friction brake bias capacity;

allocating, based on the requested friction brake split, the friction brake ratio between a front friction brake ratio and a rear friction brake ratio; and causing the one or more braking systems to apply respective portions of the braking torque indicated by the electric brake ratio, the front friction brake ratio, and the rear friction brake ratio.

9. The brake controller of claim 8, wherein:

the electric brakes comprise:

front electric brakes associated with the front axle; and rear electric brakes associated with the rear axle, the target friction brake split is further determined based on an electric brake split indicating respective usage levels of the front electric brakes and the rear electric brakes, and a respective portion of the braking torque, indicated by the electric brake ratio, comprises a first portion of the braking torque allocated to the front electric brakes and a second portion of the braking torque allocated to the rear electric brakes based on the electric brake split.

10. The brake controller of claim 8, wherein the electric brakes are associated with the rear axle.

11. The brake controller of claim 8, wherein;

the requested friction brake split is further determined based on a value of a cooling parameter, and the value of the cooling parameter indicates a torque split, between the front friction brakes and the rear friction brakes, that equalizes cooling between cooling systems associated with the front friction brakes and the rear friction brakes.

12. The brake controller of claim 8, wherein the target machine axle split is determined based on a target machine axle split map that indicates predetermined values of the target machine axle split that correspond to combinations of different grade values and different payload values.

13. The brake controller of claim 8, wherein the axle friction brake bias capacity is determined based on an axle friction brake bias capacity map that indicates predetermined values of the axle friction brake bias capacity that correspond to combinations of different values of the temperature and the temperature increase rate.

14. A machine comprising:

electric brakes;

front friction brakes associated with a front axle;

rear friction brakes associated with a rear axle; and a brake controller configured to manage the electric brakes, the front friction brakes, and the rear friction brakes by:

determining braking torque associated with a braking operation to be performed by the machine;

allocating the braking torque between an electric brake ratio and a friction brake ratio;

determining a target machine axle split, based on first sensor data indicating:

a grade value indicating a grade of a ground surface being traveled by the machine, and a payload value indicating a weight or mass of a payload carried by the machine;

determining a target friction brake split based on the electric brake ratio and the target machine axle split;

determining an axle friction brake bias capacity, based on second sensor data indicating a temperature and a temperature increase rate associated with one of the front friction brakes or the rear friction brakes;

determining a requested friction brake split based on the target friction brake split and the axle friction brake bias capacity; and allocating, based on the requested friction brake split, the friction brake ratio between a front friction brake ratio and a rear friction brake ratio.

15. The machine of claim 14, wherein the brake controller is further configured to:

cause the electric brakes to apply a first portion of the braking torque indicated by the electric brake ratio;

cause the front friction brakes to apply a second portion of the braking torque indicated by the front friction brake ratio; and cause the rear friction brakes to apply a third portion of the braking torque indicated by the rear friction brake ratio.

16. The machine of claim 15, wherein:

the electric brakes comprise:

front electric brakes associated with the front axle; and rear electric brakes associated with the rear axle, the target friction brake split is further determined based on an electric brake split indicating respective usage levels of the front electric brakes and the rear electric brakes, and the first portion of the braking torque indicated by the electric brake ratio comprises respective portions of the braking torque allocated to the front electric brakes and the rear electric brakes based on the electric brake split.

17. The machine of claim 14, wherein the electric brakes are associated with the rear axle.

18. The machine of claim 14, further comprising:

a first cooling system configured to cool the front friction brakes; and a second cooling system configured to cool the rear friction brakes, wherein the requested friction brake split is further determined based on a value of a cooling parameter indicating a torque split, between the front friction brakes and the rear friction brakes, that equalizes cooling between the first cooling system and the second cooling system.

19. The machine of claim 14, wherein the target machine axle split is determined based on a target machine axle split map that indicates predetermined values of the target machine axle split that correspond to combinations of different grade values and different payload values.

20. The machine of claim 14, wherein the axle friction brake bias capacity is determined based on an axle friction brake bias capacity map that indicates predetermined values of the axle friction brake bias capacity that correspond to combinations of different values of the temperature and the temperature increase rate.

* * * * *